(12) United States Patent
Silverbrook

(10) Patent No.: US 7,950,779 B2
(45) Date of Patent: *May 31, 2011

(54) INKJET PRINTHEAD WITH HEATERS SUSPENDED BY SLOPED SECTIONS OF LESS RESISTANCE

(75) Inventor: Kia Silverbrook, Balmain (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 0 days.

This patent is subject to a terminal disclaimer.

(21) Appl. No.: 12/618,750

(22) Filed: Nov. 15, 2009

(65) Prior Publication Data

US 2010/0060698 A1 Mar. 11, 2010

Related U.S. Application Data

(63) Continuation of application No. 12/272,753, filed on Nov. 17, 2008, now Pat. No. 7,628,471, which is a continuation of application No. 11/060,805, filed on Feb. 18, 2005, now Pat. No. 7,468,139, which is a continuation-in-part of application No. 10/728,970, filed on Dec. 8, 2003, now abandoned, which is a continuation-in-part of application No. 10/160,273, filed on Jun. 4, 2002, now Pat. No. 6,746,105, which is a continuation of application No. 09/112,767, filed on Jul. 10, 1998, now Pat. No. 6,416,167.

(30) Foreign Application Priority Data

Jul. 15, 1997 (AU) .......................................... PO7991
Mar. 25, 1998 (AU) .......................................... PP2592

(51) Int. Cl.
B41J 2/05 (2006.01)

(52) U.S. Cl. .......................................................... 347/62
(58) Field of Classification Search ..................... 347/54, 347/56, 62, 65
See application file for complete search history.

(56) References Cited

U.S. PATENT DOCUMENTS

| | | |
|---|---|---|
| 1,941,001 A | 1/1929 | Hansell |
| 3,373,437 A | 3/1968 | Sweet et al. |
| 3,596,275 A | 7/1971 | Sweet |
| 3,683,212 A | 8/1972 | Zoltan |
| 3,747,120 A | 7/1973 | Stemme |

(Continued)

FOREIGN PATENT DOCUMENTS

DE 1648322 A 3/1971

(Continued)

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-7157.

(Continued)

Primary Examiner — An H Do

(57) ABSTRACT

An inkjet printhead that has a pair of electrodes, a heater having contacts abutting the pair of electrodes, a heater element for generating a vapor bubble in a quantity of ink and sloped side portions extending between the heater element and the contacts and, a nozzle spaced from the heater such that ink is ejected through the nozzle in response to the generation of a vapor bubble. The heater element has higher electrical resistance than the contacts and the sloped side portions.

15 Claims, 27 Drawing Sheets

U.S. PATENT DOCUMENTS

| | | | |
|---|---|---|---|
| 3,946,398 A | 3/1976 | Kyser et al. | |
| 4,423,401 A | 12/1983 | Mueller | |
| 4,459,601 A | 7/1984 | Howkins | |
| 4,490,728 A | 12/1984 | Vaught et al. | |
| 4,553,393 A | 11/1985 | Ruoff | |
| 4,584,590 A | 4/1986 | Fischbeck et al. | |
| 4,672,398 A | 6/1987 | Kuwabara et al. | |
| 4,737,802 A | 4/1988 | Mielke | |
| 4,864,824 A | 9/1989 | Gabriel et al. | |
| 4,899,181 A | 2/1990 | Hawkins et al. | |
| 5,029,805 A | 7/1991 | Albarda et al. | |
| 5,113,204 A | 5/1992 | Miyazawa et al. | |
| 5,258,774 A | 11/1993 | Rogers | |
| 5,387,314 A | 2/1995 | Baughman et al. | |
| 5,666,141 A | 9/1997 | Matoba et al. | |
| 5,697,144 A | 12/1997 | Mitani et al. | |
| 5,719,604 A | 2/1998 | Inui et al. | |
| 5,801,727 A | 9/1998 | Torpey | |
| 5,828,394 A | 10/1998 | Khuri-Yakub et al. | |
| 5,851,412 A | 12/1998 | Kubby | |
| 6,007,187 A | 12/1999 | Kashino et al. | |
| 6,019,457 A | 2/2000 | Silverbrook | |
| 6,174,050 B1 | 1/2001 | Kashino et al. | |
| 6,188,415 B1 | 2/2001 | Silverbrook | |
| 6,213,589 B1 | 4/2001 | Silverbrook | |
| 6,243,113 B1 | 6/2001 | Silverbrook | |
| 6,247,790 B1 | 6/2001 | Silverbrook et al. | |
| 6,283,582 B1 | 9/2001 | Silverbrook | |
| 6,416,167 B1 | 7/2002 | Silverbrook | |
| 6,561,627 B2 | 5/2003 | Jarrold et al. | |
| 6,644,786 B1 | 11/2003 | Lebens | |
| 6,669,332 B2 | 12/2003 | Silverbrook | |
| 6,669,333 B1 | 12/2003 | Silverbrook | |
| 6,682,174 B2 | 1/2004 | Silverbrook | |
| 6,685,303 B1 | 2/2004 | Trauernicht et al. | |
| 6,736,490 B2* | 5/2004 | Sugioka | 347/56 |
| 6,866,369 B2 | 3/2005 | Silverbrook | |
| 6,874,866 B2 | 4/2005 | Silverbrook | |
| 6,886,917 B2 | 5/2005 | Silverbrook et al. | |
| 7,077,508 B2 | 7/2006 | Silverbrook | |
| 7,134,740 B2 | 11/2006 | Silverbrook | |
| 7,134,745 B2 | 11/2006 | Silverbrook | |
| 7,156,494 B2 | 1/2007 | Silverbrook et al. | |
| 7,156,495 B2 | 1/2007 | Silverbrook et al. | |
| 7,182,436 B2 | 2/2007 | Silverbrook et al. | |
| 7,188,933 B2 | 3/2007 | Silverbrook et al. | |
| 7,195,339 B2 | 3/2007 | Silverbrook | |
| 7,264,335 B2 | 9/2007 | Silverbrook et al. | |
| 7,284,838 B2 | 10/2007 | Silverbrook et al. | |
| 7,322,679 B2 | 1/2008 | Silverbrook | |
| 7,347,536 B2 | 3/2008 | Silverbrook et al. | |
| 7,438,391 B2 | 10/2008 | Silverbrook et al. | |
| 7,465,023 B2 | 12/2008 | Silverbrook | |
| 7,465,029 B2 | 12/2008 | Silverbrook et al. | |
| 7,465,030 B2 | 12/2008 | Silverbrook | |
| 7,467,855 B2 | 12/2008 | Silverbrook | |
| 7,470,003 B2 | 12/2008 | Silverbrook | |
| 7,506,969 B2 | 3/2009 | Silverbrook | |
| 7,517,057 B2 | 4/2009 | Silverbrook | |
| 7,520,594 B2 | 4/2009 | Silverbrook | |
| 7,533,967 B2 | 5/2009 | Silverbrook et al. | |
| 7,537,301 B2 | 5/2009 | Silverbrook | |
| 7,549,731 B2 | 6/2009 | Silverbrook | |
| 7,556,351 B2 | 7/2009 | Silverbrook | |
| 7,556,355 B2 | 7/2009 | Silverbrook | |
| 7,556,356 B1 | 7/2009 | Silverbrook | |
| 7,562,967 B2 | 7/2009 | Silverbrook et al. | |
| 7,566,114 B2 | 7/2009 | Silverbrook | |
| 7,568,790 B2 | 8/2009 | Silverbrook et al. | |
| 7,568,791 B2 | 8/2009 | Silverbrook | |
| 7,604,323 B2 | 10/2009 | Silverbrook et al. | |
| 7,611,227 B2 | 11/2009 | Silverbrook | |
| 7,628,471 B2* | 12/2009 | Silverbrook | 347/62 |
| 7,637,594 B2 | 12/2009 | Silverbrook et al. | |
| 7,641,314 B2 | 1/2010 | Silverbrook | |
| 7,758,161 B2 | 7/2010 | Silverbrook et al. | |
| 7,780,269 B2 | 8/2010 | Silverbrook | |
| 7,802,871 B2 | 9/2010 | Silverbrook | |
| 2005/0140727 A1 | 6/2005 | Silverbrook | |

FOREIGN PATENT DOCUMENTS

| | | |
|---|---|---|
| DE | 2905063 A | 8/1980 |
| DE | 3245283 A | 6/1984 |
| DE | 3430155 A | 2/1986 |
| DE | 8802281 U1 | 5/1988 |
| DE | 3716996 A | 12/1988 |
| DE | 3934280 A | 4/1990 |
| DE | 4031248 A1 | 4/1992 |
| DE | 4328433 A | 3/1995 |
| DE | 19516997 A | 11/1995 |
| DE | 19517969 A | 11/1995 |
| DE | 19623620 A1 | 12/1995 |
| DE | 19532913 A | 3/1996 |
| DE | 19639717 A | 4/1997 |
| EP | 0092229 A | 10/1983 |
| EP | 0398031 A | 11/1990 |
| EP | 0427291 A | 5/1991 |
| EP | 0431338 A | 6/1991 |
| EP | 0478956 | 4/1992 |
| EP | 0506232 A | 9/1992 |
| EP | 0510648 A | 10/1992 |
| EP | 0627314 A | 12/1994 |
| EP | 0634273 A2 | 1/1995 |
| EP | 0713774 A2 | 5/1996 |
| EP | 0737580 A | 10/1996 |
| EP | 0750993 A | 1/1997 |
| EP | 0882590 A | 12/1998 |
| FR | 2231076 | 12/1974 |
| GB | 792145 A | 3/1958 |
| GB | 1428239 A | 3/1976 |
| GB | 2007162 | 5/1979 |
| GB | 2262152 A | 6/1993 |
| JP | 58-112747 A | 7/1983 |
| JP | 58-116165 A | 7/1983 |
| JP | 61-025849 A | 2/1986 |
| JP | 61-268453 A | 11/1986 |
| JP | 62-094347 | 4/1987 |
| JP | 01-105746 A | 4/1989 |
| JP | 01-115639 A | 5/1989 |
| JP | 01-115693 A | 5/1989 |
| JP | 01-128839 A | 5/1989 |
| JP | 08-336965 | 5/1989 |
| JP | 01-257058 A | 10/1989 |
| JP | 01-306254 A | 12/1989 |
| JP | 02-030543 A | 1/1990 |
| JP | 02-050841 A | 2/1990 |
| JP | 02-092643 A | 4/1990 |
| JP | 02-108544 A | 4/1990 |
| JP | 02-158348 A | 6/1990 |
| JP | 02-162049 A | 6/1990 |
| JP | 02-265752 A | 10/1990 |
| JP | 03-065348 A | 3/1991 |
| JP | 03-112662 A | 5/1991 |
| JP | 03-180350 A | 8/1991 |
| JP | 04-001051 A | 1/1992 |
| JP | 04-118241 A | 4/1992 |
| JP | 04-126255 A | 4/1992 |
| JP | 04-141429 A | 5/1992 |
| JP | 04-353458 A | 12/1992 |
| JP | 04-368851 A | 12/1992 |
| JP | 05-284765 A | 10/1993 |
| JP | 05-318724 A | 12/1993 |
| JP | 06-091865 A | 4/1994 |
| JP | 06-091866 A | 4/1994 |
| JP | 07-314665 A | 12/1995 |
| JP | 01-115639 A | 4/1996 |
| JP | 08-142323 | 6/1996 |
| JP | 07-314665 A | 12/1996 |
| WO | WO 94/18010 A | 8/1994 |
| WO | WO 97/12689 A | 4/1997 |

OTHER PUBLICATIONS

Yamagata, Yutaka et al, "A Micro Mobile Mechanism Using Thermal Expansion and its Theoretical Analysis". Proceedings of the workshop on micro electro mechanical systems (MEMS), US, New York, IEEE, vol. Workshop 7, Jan. 25, 1994, pp. 142-147, XP000528408, ISBN: 0-7803-1834-X.

Noworolski J M et al: "Process for in-plane and out-of-plane single-crystal-silicon thermal microactuators" Sensors and Actuators A, Ch. Elsevier Sequoia S.A., Lausane, vol. 55, No. 1, Jul. 15, 1996, pp. 65-69, XP004077979.

* cited by examiner

INKJET PRINTHEAD WITH HEATERS SUSPENDED BY SLOPED SECTIONS OF LESS RESISTANCE

CROSS REFERENCES TO RELATED APPLICATIONS

The present application is a Continuation of U.S. application Ser. No. 12/272,753 filed Nov. 17, 2008, now issued U.S. Pat. No. 7,628,471, which is a Continuation of U.S. application Ser. No. 11/060,805, filed Feb. 18, 2005, now issued U.S. Pat. No. 7,468,139, which is a Continuation-In-Part of U.S. application Ser. No. 10/728,970 filed Dec. 8, 2003, now abandoned, which is a Continuation-In-Part of U.S. application Ser. No. 10/160,273 filed Jun. 4, 2002, now issued U.S. Pat. No. 6,746,105, which is a Continuation of U.S. application Ser. No. 09/112,767 filed Jul. 10, 1998, now issued U.S. Pat. No. 6,416,167, the entire contents of which are herein incorporated by reference.

The following Australian provisional patent applications/granted patents are hereby incorporated by cross-reference. For the purposes of location and identification, US patent applications identified by their US patent application serial numbers (USSN)/granted numbers are listed alongside the Australian applications from which the US patent applications claim the right of priority.

| CROSS-REFERENCED AUSTRALIAN PROVISIONAL PATENT APPLICATION NO. | US PATENT/PATENT APPLICATION (CLAIMING RIGHT OF PRIORITY FROM AUSTRALIAN PROVISIONAL APPLICATION) | DOCKET NO. |
|---|---|---|
| PO7991 | 6,750,901 | ART01US |
| PO8505 | 6,476,863 | ART02US |
| PO7988 | 6,788,336 | ART03US |
| PO9395 | 6,322,181 | ART04US |
| PO8017 | 6,597,817 | ART06US |
| PO8014 | 6,227,648 | ART07US |
| PO8025 | 6,727,948 | ART08US |
| PO8032 | 6,690,419 | ART09US |
| PO7999 | 6,727,951 | ART10US |
| PO8030 | 6,196,541 | ART13US |
| PO7997 | 6,195,150 | ART15US |
| PO7979 | 6,362,868 | ART16US |
| PO7978 | 6,831,681 | ART18US |
| PO7982 | 6,431,669 | ART19US |
| PO7989 | 6,362,869 | ART20US |
| PO8019 | 6,472,052 | ART21US |
| PO7980 | 6,356,715 | ART22US |
| PO8018 | 6,894,694 | ART24US |
| PO7938 | 6,636,216 | ART25US |
| PO8016 | 6,366,693 | ART26US |
| PO8024 | 6,329,990 | ART27US |
| PO7939 | 6,459,495 | ART29US |
| PO8501 | 6,137,500 | ART30US |
| PO8500 | 6,690,416 | ART31US |
| PO7987 | 7,050,143 | ART32US |
| PO8022 | 6,398,328 | ART33US |
| PO8497 | 7,110,024 | ART34US |
| PO8020 | 6,431,704 | ART38US |
| PO8504 | 6,879,341 | ART42US |
| PO8000 | 6,415,054 | ART43US |
| PO7934 | 6,665,454 | ART45US |
| PO7990 | 6,542,645 | ART46US |
| PO8499 | 6,486,886 | ART47US |
| PO8502 | 6,381,361 | ART48US |
| PO7981 | 6,317,192 | ART50US |
| PO7986 | 6,850,274 | ART51US |
| PO7983 | 09/113,054 | ART52US |
| PO8026 | 6,646,757 | ART53US |
| PO8028 | 6,624,848 | ART56US |
| PO9394 | 6,357,135 | ART57US |
| PO9397 | 6,271,931 | ART59US |
| PO9398 | 6,353,772 | ART60US |
| PO9399 | 6,106,147 | ART61US |
| PO9400 | 6,665,008 | ART62US |
| PO9401 | 6,304,291 | ART63US |
| PO9403 | 6,305,770 | ART65US |
| PO9405 | 6,289,262 | ART66US |
| PP0959 | 6,315,200 | ART68US |
| PP1397 | 6,217,165 | ART69US |
| PP2370 | 6,786,420 | DOT01US |
| PO8003 | 6,350,023 | Fluid01US |
| PO8005 | 6,318,849 | Fluid02US |
| PO8066 | 6,227,652 | IJ01US |
| PO8072 | 6,213,588 | IJ02US |
| PO8040 | 6,213,589 | IJ03US |
| PO8071 | 6,231,163 | IJ04US |
| PO8047 | 6,247,795 | IJ05US |
| PO8035 | 6,394,581 | IJ06US |
| PO8044 | 6,244,691 | IJ07US |
| PO8063 | 6,257,704 | IJ08US |
| PO8057 | 6,416,168 | IJ09US |
| PO8056 | 6,220,694 | IJ10US |
| PO8069 | 6,257,705 | IJ11US |
| PO8049 | 6,247,794 | IJ12US |
| PO8036 | 6,234,610 | IJ13US |
| PO8048 | 6,247,793 | IJ14US |
| PO8070 | 6,264,306 | IJ15US |
| PO8067 | 6,241,342 | IJ16US |
| PO8001 | 6,247,792 | IJ17US |
| PO8038 | 6,264,307 | IJ18US |
| PO8033 | 6,254,220 | IJ19US |
| PO8002 | 6,234,611 | IJ20US |
| PO8068 | 6,302,528 | IJ21US |
| PO8062 | 6,283,582 | IJ22US |
| PO8034 | 6,239,821 | IJ23US |
| PO8039 | 6,338,547 | IJ24US |
| PO8041 | 6,247,796 | IJ25US |
| PO8004 | 6,557,977 | IJ26US |
| PO8037 | 6,390,603 | IJ27US |
| PO8043 | 6,362,843 | IJ28US |
| PO8042 | 6,293,653 | IJ29US |
| PO8064 | 6,312,107 | IJ30US |
| PO9389 | 6,227,653 | IJ31US |
| PO9391 | 6,234,609 | IJ32US |
| PP0888 | 6,238,040 | IJ33US |
| PP0891 | 6,188,415 | IJ34US |
| PP0890 | 6,227,654 | IJ35US |
| PP0873 | 6,209,989 | IJ36US |
| PP0993 | 6,247,791 | IJ37US |
| PP0890 | 6,336,710 | IJ38US |
| PP1398 | 6,217,153 | IJ39US |
| PP2592 | 6,416,167 | IJ40US |
| PP2593 | 6,243,113 | IJ41US |
| PP3991 | 6,283,581 | IJ42US |
| PP3987 | 6,247,790 | IJ43US |
| PP3985 | 6,260,953 | IJ44US |
| PP3983 | 6,267,469 | IJ45US |
| PO7935 | 6,224,780 | IJM01US |
| PO7936 | 6,235,212 | IJM02US |
| PO7937 | 6,280,643 | IJM03US |
| PO8061 | 6,284,147 | IJM04US |
| PO8054 | 6,214,244 | IJM05US |
| PO8065 | 6,071,750 | IJM06US |
| PO8055 | 6,267,905 | IJM07US |
| PO8053 | 6,251,298 | IJM08US |
| PO8078 | 6,258,285 | IJM09US |
| PO7933 | 6,225,138 | IJM10US |
| PO7950 | 6,241,904 | IJM11US |
| PO7949 | 6,299,786 | IJM12US |
| PO8060 | 6,866,789 | IJM13US |

-continued

| CROSS-REFERENCED AUSTRALIAN PROVISIONAL PATENT APPLICATION NO. | US PATENT/PATENT APPLICATION (CLAIMING RIGHT OF PRIORITY FROM AUSTRALIAN PROVISIONAL APPLICATION) | DOCKET NO. |
|---|---|---|
| PO8059 | 6,231,773 | IJM14US |
| PO8073 | 6,190,931 | IJM15US |
| PO8076 | 6,248,249 | IJM16US |
| PO8075 | 6,290,862 | IJM17US |
| PO8079 | 6,241,906 | IJM18US |
| PO8050 | 6,565,762 | IJM19US |
| PO8052 | 6,241,905 | IJM20US |
| PO7948 | 6,451,216 | IJM21US |
| PO7951 | 6,231,772 | IJM22US |
| PO8074 | 6,274,056 | IJM23US |
| PO7941 | 6,290,861 | IJM24US |
| PO8077 | 6,248,248 | IJM25US |
| PO8058 | 6,306,671 | IJM26US |
| PO8051 | 6,331,258 | IJM27US |
| PO8045 | 6,110,754 | IJM28US |
| PO7952 | 6,294,101 | IJM29US |
| PO8046 | 6,416,679 | IJM30US |
| PO9390 | 6,264,849 | IJM31US |
| PO9392 | 6,254,793 | IJM32US |
| PP0889 | 6,235,211 | IJM35US |
| PP0887 | 6,491,833 | IJM36US |
| PP0882 | 6,264,850 | IJM37US |
| PP0874 | 6,258,284 | IJM38US |
| PP1396 | 6,312,615 | IJM39US |
| PP3989 | 6,228,668 | IJM40US |
| PP2591 | 6,180,427 | IJM41US |
| PP3990 | 6,171,875 | IJM42US |
| PP3986 | 6,267,904 | IJM43US |
| PP3984 | 6,245,247 | IJM44US |
| PP3982 | 6,315,914 | IJM45US |
| PP0895 | 6,231,148 | IR01US |
| PP0869 | 6,293,658 | IR04US |
| PP0887 | 6,614,560 | IR05US |
| PP0885 | 6,238,033 | IR06US |
| PP0884 | 6,312,070 | IR10US |
| PP0886 | 6,238,111 | IR12US |
| PP0877 | 6,378,970 | IR16US |
| PP0878 | 6,196,739 | IR17US |
| PP0883 | 6,270,182 | IR19US |
| PP0880 | 6,152,619 | IR20US |
| PO8006 | 6,087,638 | MEMS02US |
| PO8007 | 6,340,222 | MEMS03US |
| PO8010 | 6,041,600 | MEMS05US |
| PO8011 | 6,299,300 | MEMS06US |
| PO7947 | 6,067,797 | MEMS07US |
| PO7944 | 6,286,935 | MEMS09US |
| PO7946 | 6,044,646 | MEMS10US |
| PP0894 | 6,382,769 | MEMS13US |

STATEMENT REGARDING FEDERALLY SPONSORED RESEARCH OR DEVELOPMENT

Not applicable.

FIELD OF THE INVENTION

The present invention relates to the field of inkjet printers and, discloses an inkjet printing system using printheads manufactured with microelectro-mechanical systems (MEMS) techniques.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207-220 (1988).

Ink Jet printers themselves come in many different types. The utilization of a continuous stream of ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of a continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed ink jet printing techniques that rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

In the construction of any inkjet printing system, there are a considerable number of important factors which must be traded off against one another especially as large scale printheads are constructed, especially those of a pagewidth type. A number of these factors are outlined in the following paragraphs.

Firstly, inkjet printheads are normally constructed utilizing micro-electromechanical systems (MEMS) techniques. As such, they tend to rely upon standard integrated circuit construction/fabrication techniques of depositing planar layers on a silicon wafer and etching certain portions of the planar layers. Within silicon circuit fabrication technology, certain techniques are better known than others. For example, the techniques associated with the creation of CMOS circuits are likely to be more readily used than those associated with the creation of exotic circuits including ferroelectrics, galium arsenide etc. Hence, it is desirable, in any MEMS constructions, to utilize well proven semi-conductor fabrication techniques which do not require any "exotic" processes or materials. Of course, a certain degree of trade off will be undertaken in that if the advantages of using the exotic material far out weighs its disadvantages then it may become desirable to utilize the material anyway. However, if it is possible to achieve the same, or similar, properties using more common materials, the problems of exotic materials can be avoided.

With a large array of ink ejection nozzles, it is desirable to provide for a highly automated form of manufacturing which results in an inexpensive production of multiple printhead devices.

Preferably, the device constructed utilizes a low amount of energy in the ejection of ink. The utilization of a low amount of energy is particularly important when a large pagewidth full color printhead is constructed having a large array of individual print ejection mechanism with each ejection mechanisms, in the worst case, being fired in a rapid sequence.

SUMMARY OF THE INVENTION

It is an object of the present invention to provide an ink ejection nozzle arrangement suitable for incorporation into an inkjet printhead arrangement for the ejection of ink on demand from a nozzle chamber in an efficient and reliable manner.

According to a first aspect, the present invention provides an ink jet printhead comprising:

a plurality of nozzles;

a bubble forming chamber corresponding to each of the nozzles respectively, the bubble forming chambers adapted to contain a bubble forming liquid; and, at least one heater element disposed in each of the bubble forming chambers respectively, the heater elements configured for thermal contact with the bubble forming liquid; such that, heating the heater element to a temperature above the boiling point of the bubble forming liquid forms a gas bubble that causes the ejection of a drop of an ejectable liquid through the nozzle corresponding to that heater element; wherein, the bubble forming chamber is at least partially formed by an amorphous ceramic material.

Amorphous ceramic material provides the bubble forming chamber with high strength. The non-crystalline structure avoids any points of weakness due to crystalline defects. These defects can act as stress concentration areas and are prone to failure.

According to a second aspect, the present invention provides a printer system which incorporates a printhead, the printhead comprising:

a plurality of nozzles;

a bubble forming chamber corresponding to each of the nozzles respectively, the bubble forming chambers adapted to contain a bubble forming liquid; and, at least one heater element disposed in each of the bubble forming chambers respectively, the heater elements configured for thermal contact with the bubble forming liquid; such that, heating the heater element to a temperature above the boiling point of the bubble forming liquid forms a gas bubble that causes the ejection of a drop of an ejectable liquid through the nozzle corresponding to that heater element; wherein, the bubble forming chamber is at least partially formed by an amorphous ceramic material.

According to a third aspect, the present invention provides a method of ejecting drops of an ejectable liquid from a printhead, the printhead comprising a plurality of nozzles;

a chamber corresponding to each of the nozzles respectively, the chambers adapted to contain an ejectable liquid; and, at least one droplet ejection actuator associated with each of the chambers respectively; wherein, the chamber is at least partially formed by an amorphous ceramic material;

the method comprising the steps of:

placing the ejectable liquid into contact with the drop ejection actuator; and actuating the droplet ejection actuator such that a droplet of an ejectable liquid is ejected through the corresponding nozzle.

Preferably, the amorphous ceramic material is silicon nitride. In another form, the amorphous ceramic material is silicon dioxide. In yet another embodiment, the amorphous ceramic material is silicon oxynitride.

Preferably, the thermal actuator units are interconnected at a first end to a substrate and at a second end to a rigid strut member. The rigid strut member can, in turn, be interconnected to the arm having one end attached to the paddle vane. The thermal actuator units can operate upon conductive heating along a conductive trace and the conductive heating can include the generation of a substantial portion of the heat in the area adjacent the first end. The conductive heating trace can include a thinned cross-section adjacent the first end. The heating layers of the thermal actuator units can comprise substantially either a copper nickel alloy or titanium nitride. The paddle can be constructed from a similar conductive material to portions of the thermal actuator units however it is conductively insulated therefrom.

Preferably, the thermal actuator units are constructed from multiple layers utilizing a single mask to etch the multiple layers.

The nozzle chamber can include an actuator access port in a second surface of the chamber. The access port can comprise a slot in a corner of the chamber and the actuator is able to move in an arc through the slot. The actuator can include an end portion that mates substantially with a wall of the chamber at substantially right angles to the paddle vane. The paddle vane can include a depressed portion substantially opposite the fluid ejection port.

In accordance with a further aspect of the present invention, there is provided a thermal actuator including a series of lever arms attached at one end to a substrate, the thermal actuator being operational as a result of conductive heating of a conductive trace, the conductive trace including a thinned cross-section substantially adjacent the attachment to the substrate.

BRIEF DESCRIPTION OF THE DRAWINGS

Notwithstanding any other forms that may fall within the scope of the present invention, preferred forms of the invention will now be described, by way of example only, with reference to the accompanying drawings in which.

DESCRIPTION OF PREFERRED AND OTHER EMBODIMENTS

Bubble Forming Heater Element Actuator

Figure 1:
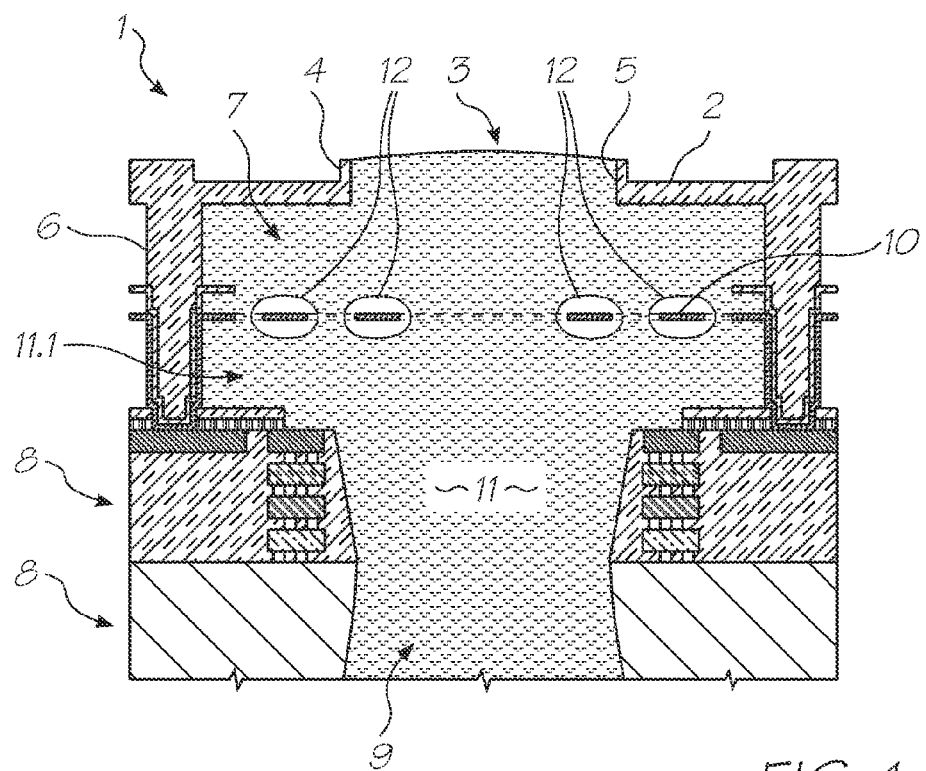
FIG. 1 is a schematic cross-sectional view through an ink chamber of a unit cell of a printhead according to an embodiment using a bubble forming heater element.

With reference to FIGS. 1 to 4, the unit cell 1 of a printhead according to an embodiment of the invention comprises a nozzle plate 2 with nozzles 3 therein, the nozzles having nozzle rims 4, and apertures 5 extending through the nozzle plate. The nozzle plate 2 is plasma etched from a silicon nitride structure which is deposited, by way of chemical vapor deposition (CVD), over a sacrificial material which is subsequently etched.

The printhead also includes, with respect to each nozzle 3, side walls 6 on which the nozzle plate is supported, a chamber 7 defined by the walls and the nozzle plate 2, a multi-layer substrate 8 and an inlet passage 9 extending through the multi-layer substrate to the far side (not shown) of the substrate. A looped, elongate heater element 10 is suspended within the chamber 7, so that the element is in the form of a suspended beam. The printhead as shown is a microelectromechanical system (MEMS) structure, which is formed by a lithographic process which is described in more detail below.

When the printhead is in use, ink 11 from a reservoir (not shown) enters the chamber 7 via the inlet passage 9, so that the chamber fills to the level as shown in FIG. 1. Thereafter, the heater element 10 is heated for somewhat less than 1 microsecond, so that the heating is in the form of a thermal pulse. It will be appreciated that the heater element 10 is in thermal contact with the ink 11 in the chamber 7 so that when the element is heated, this causes the generation of vapor bubbles 12 in the ink. Accordingly, the ink 11 constitutes a bubble forming liquid. FIG. 1 shows the formation of a bubble 12 approximately 1 microsecond after generation of the thermal pulse, that is, when the bubble has just nucleated on the heater elements 10. It will be appreciated that, as the heat is applied in the form of a pulse, all the energy necessary to generate the bubble 12 is to be supplied within that short time.

When the element 10 is heated as described above, the bubble 12 forms along the length of the element, this bubble appearing, in the cross-sectional view of FIG. 1, as four bubble portions, one for each of the element portions shown in cross section.

The bubble 12, once generated, causes an increase in pressure within the chamber 7, which in turn causes the ejection of a drop 16 of the ink 11 through the nozzle 3. The rim 4 assists in directing the drop 16 as it is ejected, so as to minimize the chance of drop misdirection.

The reason that there is only one nozzle 3 and chamber 7 per inlet passage 9 is so that the pressure wave generated within the chamber, on heating of the element 10 and forming of a bubble 12, does not affect adjacent chambers and their corresponding nozzles. The pressure wave generated within the chamber creates significant stresses in the chamber wall. Forming the chamber from an amorphous ceramic such as silicon nitride, silicon dioxide (glass) or silicon oxynitride, gives the chamber walls high strength while avoiding the use of material with a crystal structure. Crystalline defects can act as stress concentration points and therefore potential areas of weakness and ultimately failure.

Figure 2:
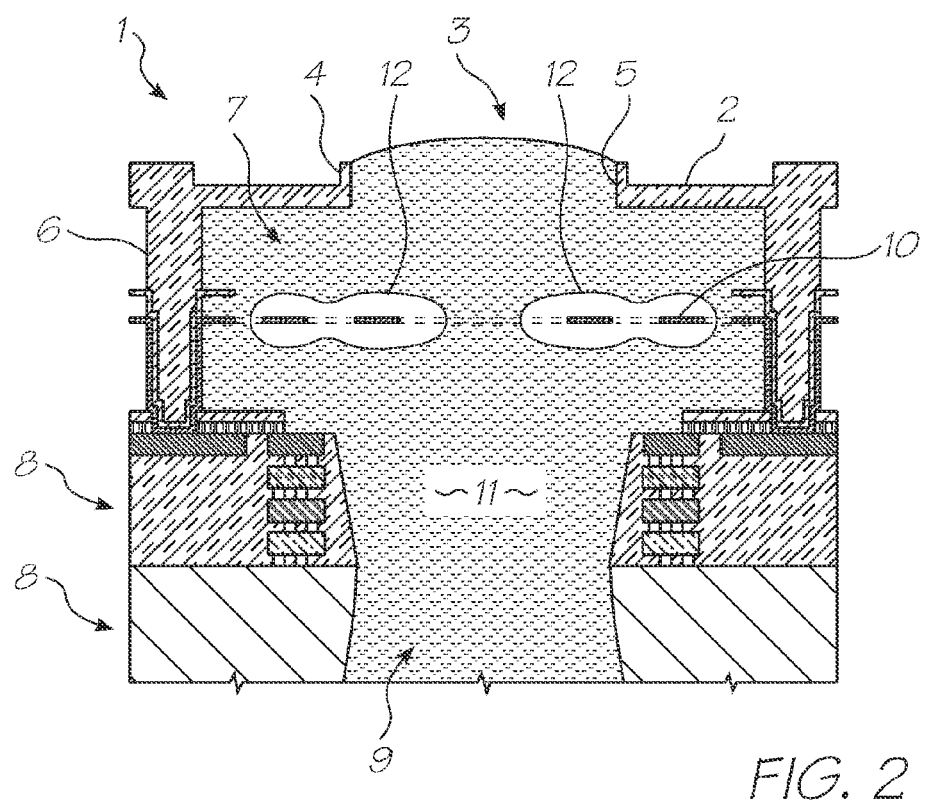
FIG. 2 is a schematic cross-sectional view through the ink chamber FIG. 1, at another stage of operation.
Figure 3:
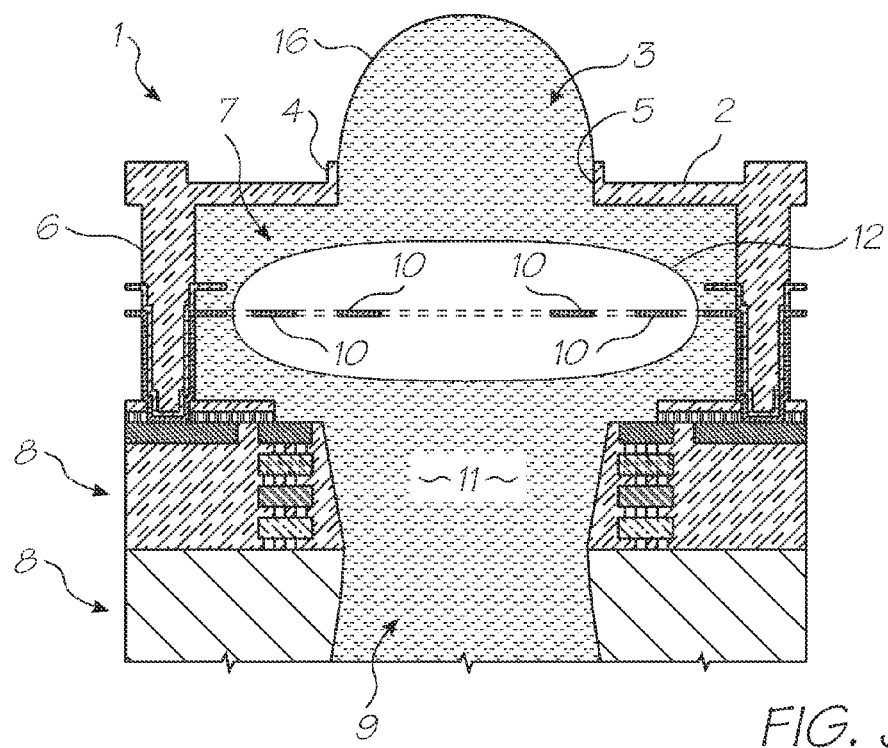
FIG. 3 is a schematic cross-sectional view through the ink chamber FIG. 1, at yet another stage of operation.

FIGS. 2 and 3 show the unit cell 1 at two successive later stages of operation of the printhead. It can be seen that the bubble 12 generates further, and hence grows, with the resultant advancement of ink 11 through the nozzle 3. The shape of the bubble 12 as it grows, as shown in FIG. 3, is determined by a combination of the inertial dynamics and the surface tension of the ink 11. The surface tension tends to minimize the surface area of the bubble 12 so that, by the time a certain amount of liquid has evaporated, the bubble is essentially disk-shaped.

The increase in pressure within the chamber 7 not only pushes ink 11 out through the nozzle 3, but also pushes some ink back through the inlet passage 9. However, the inlet passage 9 is approximately 200 to 300 microns in length, and is only approximately 16 microns in diameter. Hence there is a substantial viscous drag. As a result, the predominant effect of the pressure rise in the chamber 7 is to force ink out through the nozzle 3 as an ejected drop 16, rather than back through the inlet passage 9.

Figure 4:
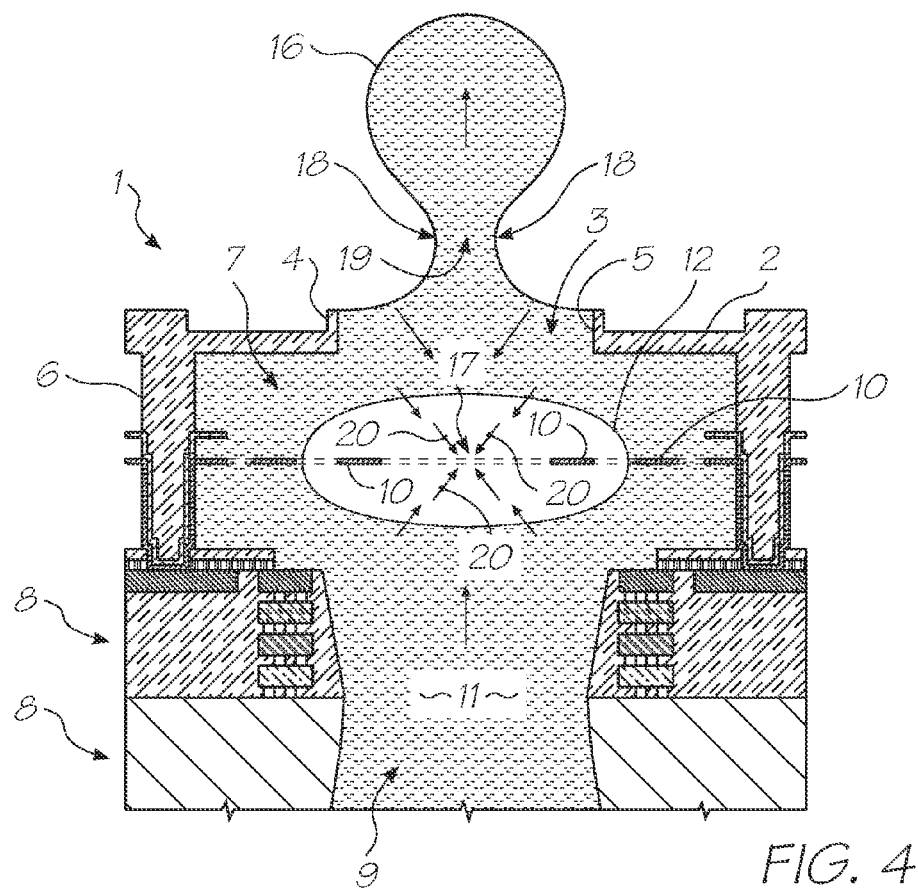
FIG. 4 is a schematic cross-sectional view through the ink chamber FIG. 1, at yet a further stage of operation.
Figure 5:
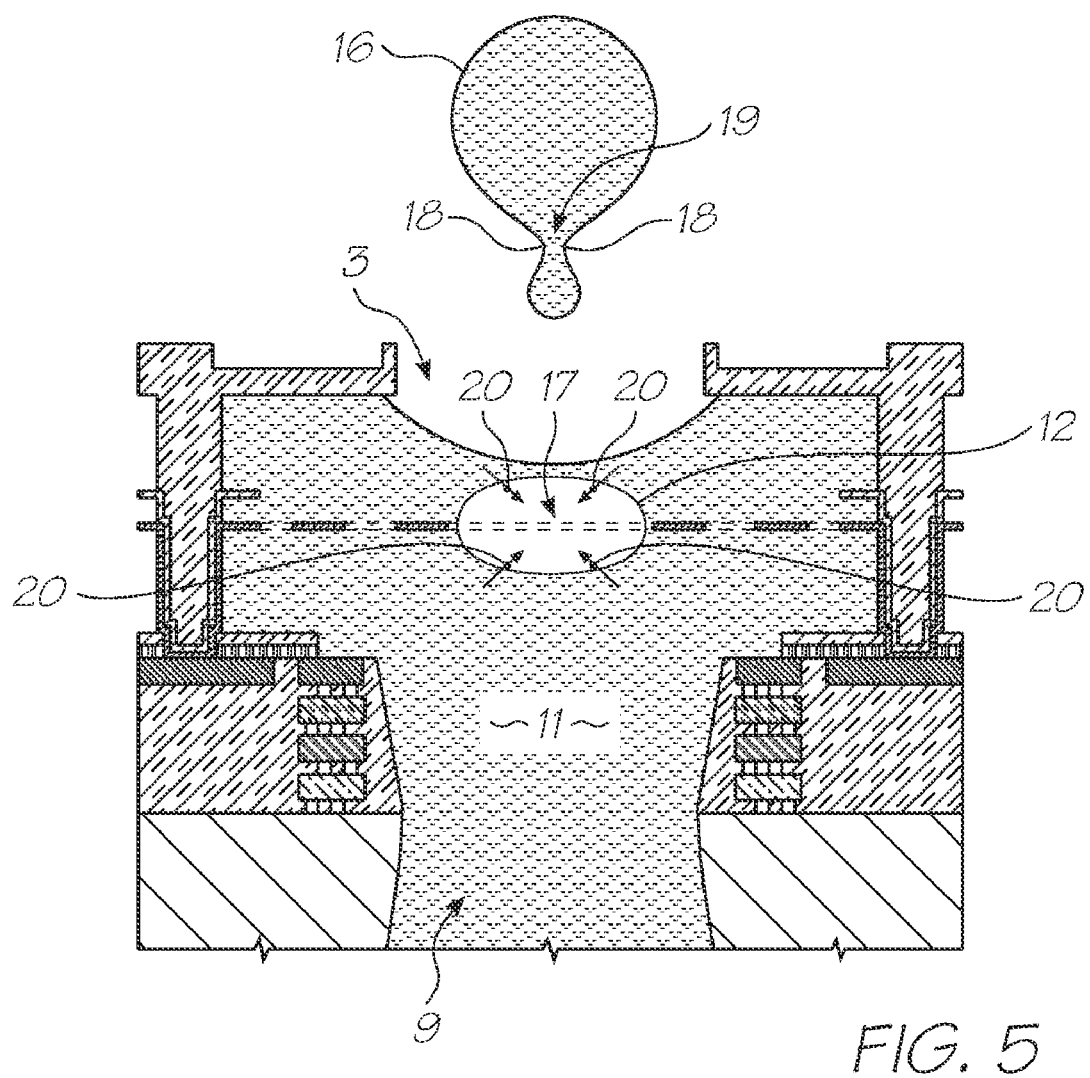
FIG. 5 is a diagrammatic cross-sectional view through a unit cell of a printhead in accordance with an embodiment of the invention showing the collapse of a vapor bubble.

Turning now to FIG. 4, the printhead is shown at a still further successive stage of operation, in which the ink drop 16 that is being ejected is shown during its "necking phase" before the drop breaks off. At this stage, the bubble 12 has already reached its maximum size and has then begun to collapse towards the point of collapse 17, as reflected in more detail in FIG. 21.

The collapsing of the bubble 12 towards the point of collapse 17 causes some ink 11 to be drawn from within the nozzle 3 (from the sides 18 of the drop), and some to be drawn from the inlet passage 9, towards the point of collapse. Most of the ink 11 drawn in this manner is drawn from the nozzle 3, forming an annular neck 19 at the base of the drop 16 prior to its breaking off.

The drop 16 requires a certain amount of momentum to overcome surface tension forces, in order to break off. As ink 11 is drawn from the nozzle 3 by the collapse of the bubble 12, the diameter of the neck 19 reduces thereby reducing the amount of total surface tension holding the drop, so that the momentum of the drop as it is ejected out of the nozzle is sufficient to allow the drop to break off.

When the drop 16 breaks off, cavitation forces are caused as reflected by the arrows 20, as the bubble 12 collapses to the point of collapse 17. It will be noted that there are no solid surfaces in the vicinity of the point of collapse 17 on which the cavitation can have an effect.

Features and Advantages of Further Embodiments

FIGS. 6 to 29 show further embodiments of unit cells 1 for thermal inkjet printheads, each embodiment having its own particular functional advantages. These advantages will be discussed in detail below, with reference to each individual embodiment. For consistency, the same reference numerals are used in FIGS. 6 to 29 to indicate corresponding components.

Figure 6:
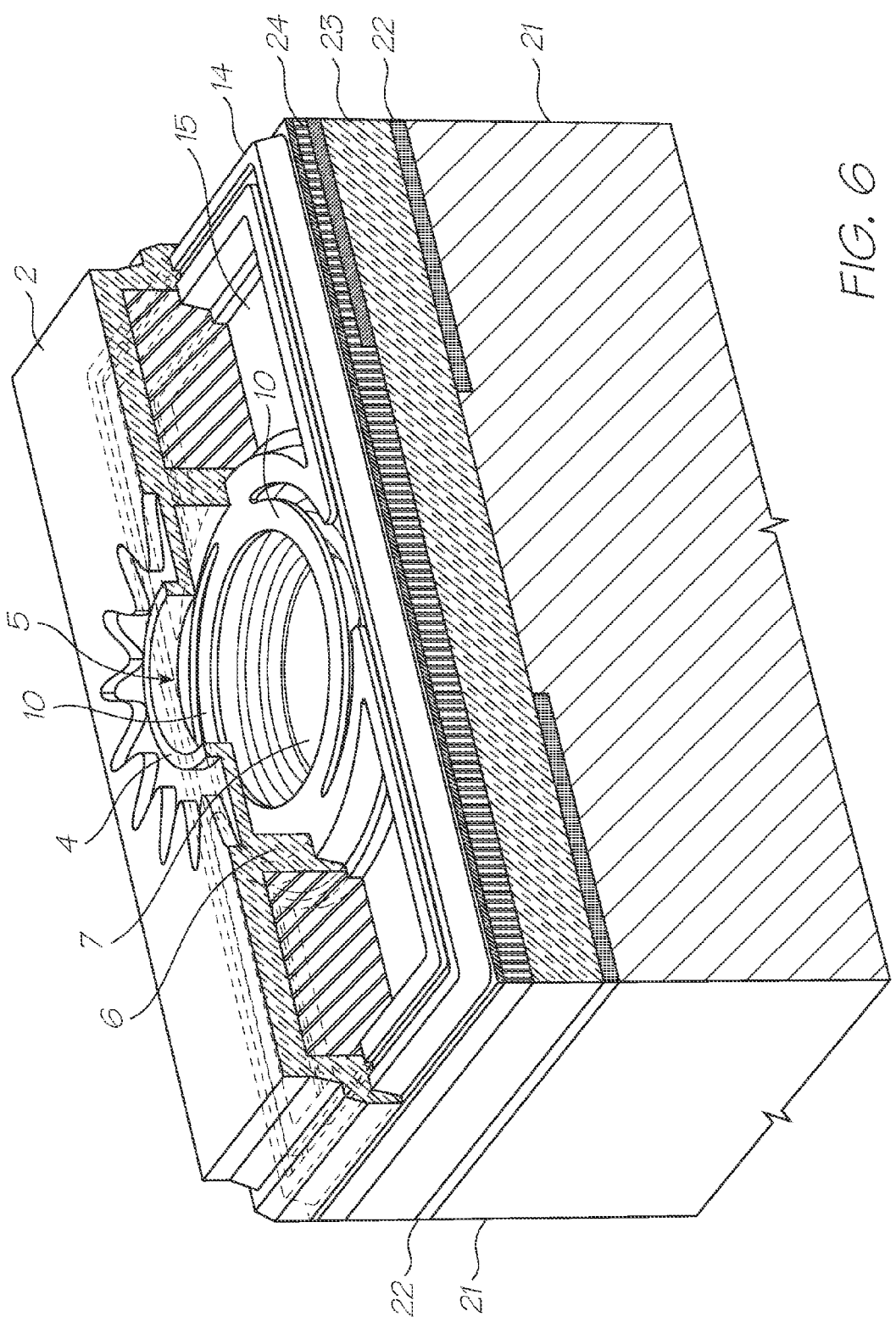
FIG. 6 is a schematic, partially cut away, perspective view of a further embodiment of a unit cell of a printhead.
Figure 7:
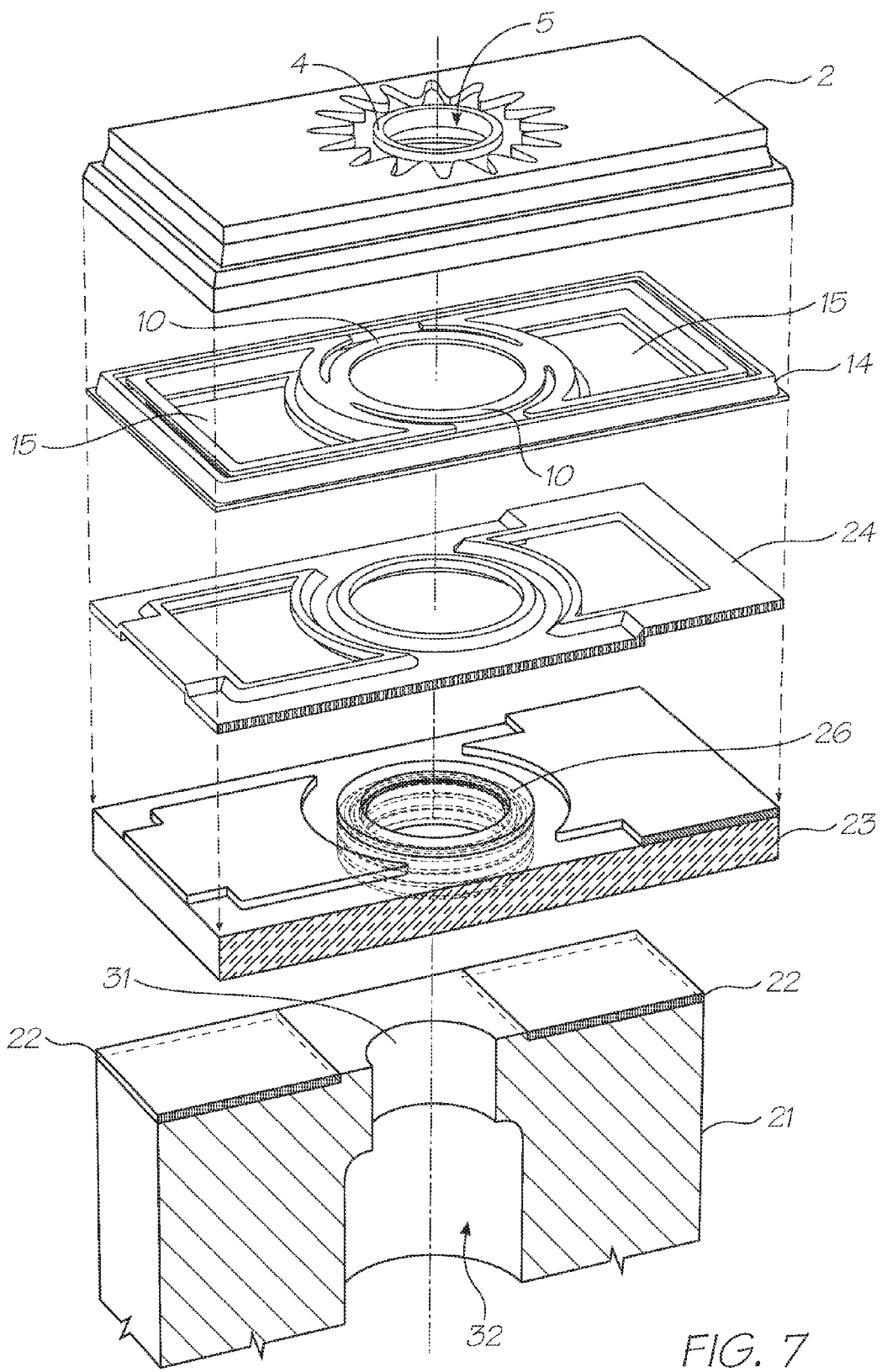
FIG. 7 is a schematic, partially cut away, exploded perspective view of the unit cell of FIG. 6.

Referring to FIGS. 6 and 7, the unit cell 1 shown has the chamber 7, ink supply passage 32 and the nozzle rim 4 positioned midway along the length of the unit cell 1. As best seen in FIG. 7, the drive circuitry 22 is partially on one side of the chamber 7 with the remainder on the opposing side of the chamber. The drive circuitry 22 controls the operation of the heater 14 through vias in the integrated circuit metallisation layers of the interconnect 23. The interconnect 23 has a raised metal layer on its top surface. Passivation layer 24 is formed in top of the interconnect 23 but leaves areas of the raised metal layer exposed. Electrodes 15 of the heater 14 contact the exposed metal areas to supply power to the element 10.

Alternatively, the drive circuitry 22 for one unit cell is not on opposing sides of the heater element that it controls. All the drive circuitry 22 for the heater 14 of one unit cell is in a single, undivided area that is offset from the heater. That is, the drive circuitry 22 is partially overlaid by one of the electrodes 15 of the heater 14 that it is controlling, and partially overlaid by one or more of the heater electrodes 15 from adjacent unit cells. In this situation, the center of the drive circuitry 22 is less than 200 microns from the center of the associate nozzle aperture 5. In most Memjet printheads of this type, the offset is less than 100 microns and in many cases less than 50 microns, preferably less than 30 microns.

Configuring the nozzle components so that there is significant overlap between the electrodes and the drive circuitry provides a compact design with high nozzle density (nozzles per unit area of the nozzle plate 2). This also improves the efficiency of the printhead by shortening the length of the conductors from the circuitry to the electrodes. The shorter conductors have less resistance and therefore dissipate less energy.

Figure 14:
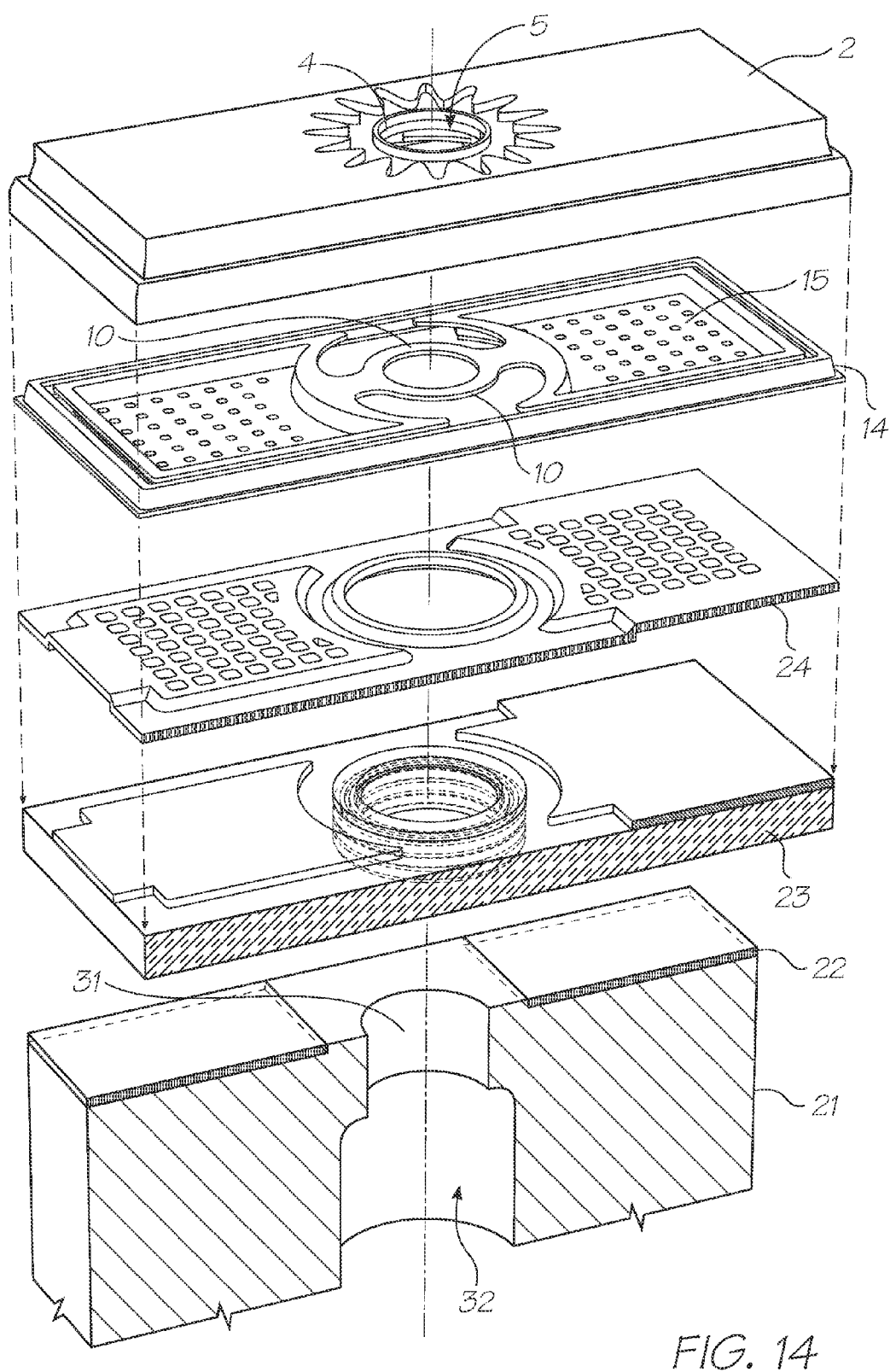
FIG. 14 is a schematic, partially cut away, exploded perspective view of the unit cell of FIG. 13.
Figure 15:
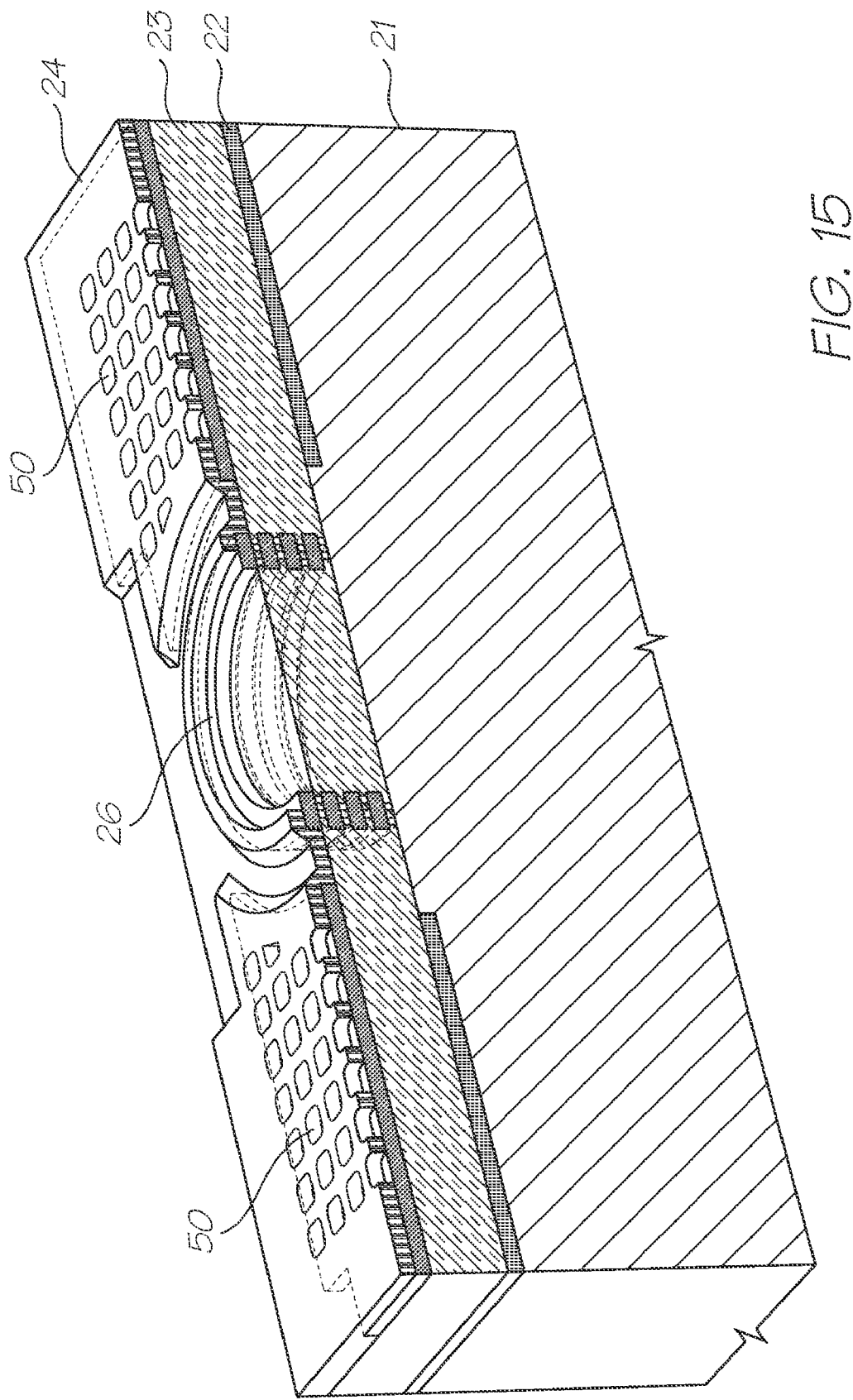
FIGS. 15 to 25 are schematic perspective views of the unit cell shown in FIGS. 29 and 30, at various successive stages in the production process of the printhead.

The high degree of overlap between the electrodes 15 and the drive circuitry 22 also allows more vias between the heater material and the CMOS metalization layers of the interconnect 23. As best shown in FIGS. 14 and 15, the passivation layer 24 has an array of vias to establish an electrical connection with the heater 14. More vias lowers the resistance between the heater electrodes 15 and the interconnect layer 23 which reduces power losses. However, the passivation layer 24 and electrodes 15 may also be provided without vias in order to simplify the fabrication process.

Figure 8:
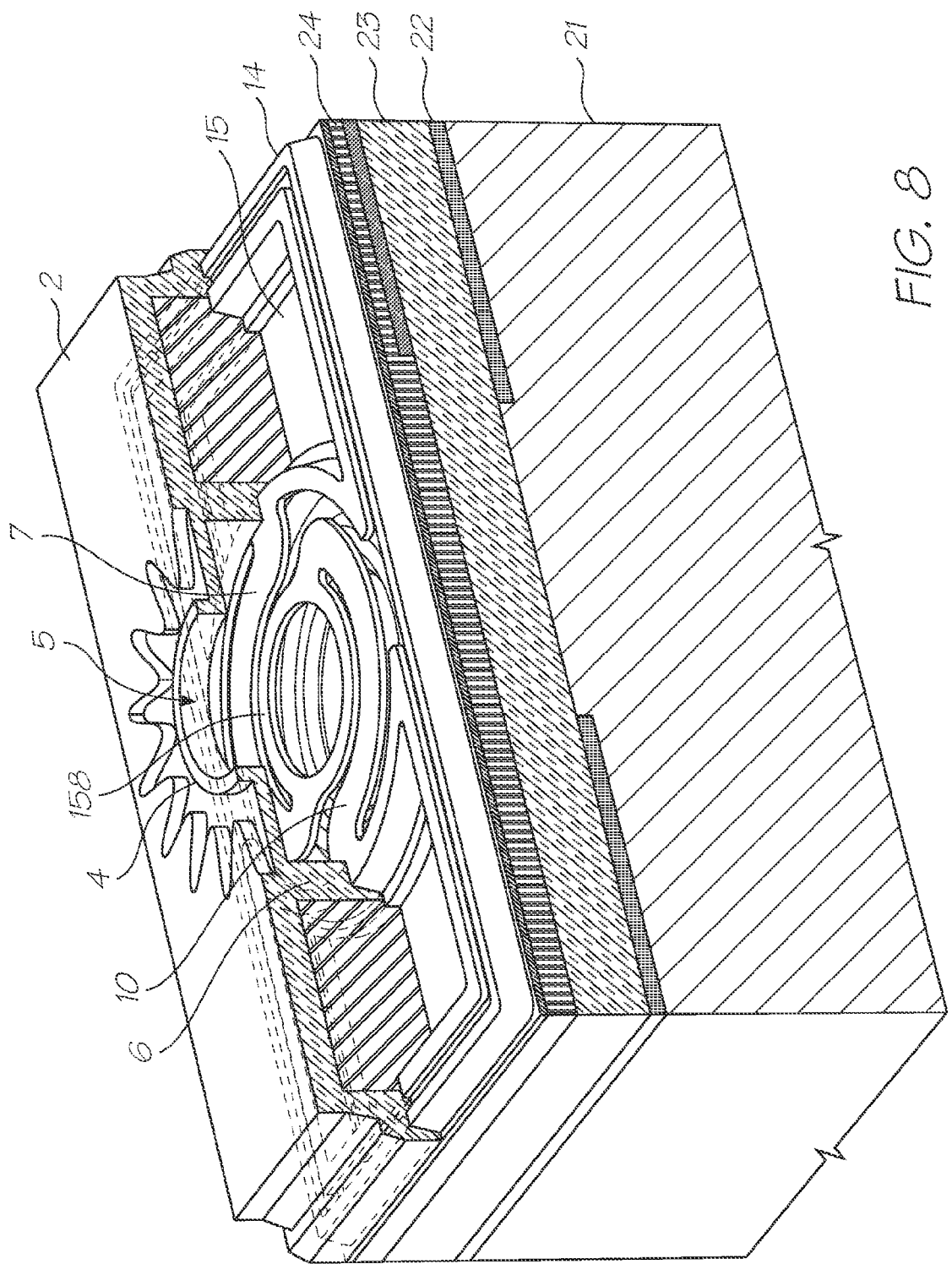
FIG. 8 is a schematic, partially cut away, perspective view of a further embodiment of a unit cell of a printhead.
Figure 9:
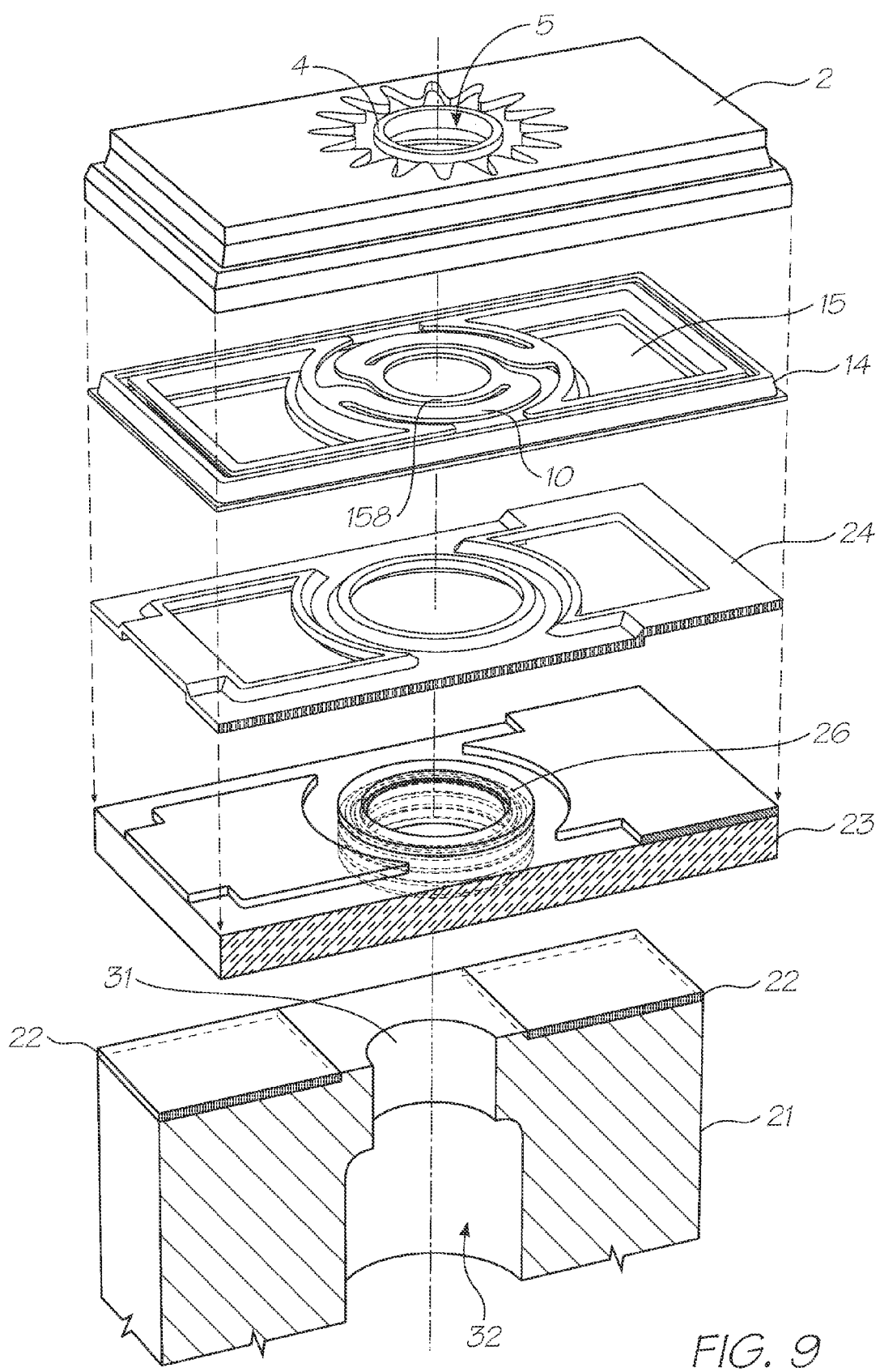
FIG. 9 is a schematic, partially cut away, exploded perspective view of the unit cell of FIG. 8.

In FIGS. 8 and 9, the unit cell 1 is the same as that of FIGS. 6 and 7 apart from the heater element 10. The heater element 10 has a bubble nucleation section 158 with a smaller cross section than the remainder of the element. The bubble nucleation section 158 has a greater resistance and heats to a temperature above the boiling point of the ink before the remainder of the element 10. The gas bubble nucleates at this region and subsequently grows to surround the rest of the element 10. By controlling the bubble nucleation and growth, the trajectory of the ejected drop is more predictable.

The heater element 10 is configured to accommodate thermal expansion in a specific manner. As heater elements expand, they will deform to relieve the strain. Elements such as that shown in FIGS. 6 and 7 will bow out of the plane of lamination because its thickness is the thinnest cross sectional dimension and therefore has the least bending resistance. Repeated bending of the element can lead to the formation of cracks, especially at sharp corners, which can ultimately lead to failure. The heater element 10 shown in FIGS. 8 and 9 is configured so that the thermal expansion is relieved by rotation of the bubble nucleation section 158, and slightly splaying the sections leading to the electrodes 15, in preference to bowing out of the plane of lamination. The geometry of the element is such that miniscule bending within the plane of lamination is sufficient to relieve the strain of thermal expansion, and such bending occurs in preference to bowing. This gives the heater element greater longevity and reliability by minimizing bend regions, which are prone to oxidation and cracking.

Figure 10:
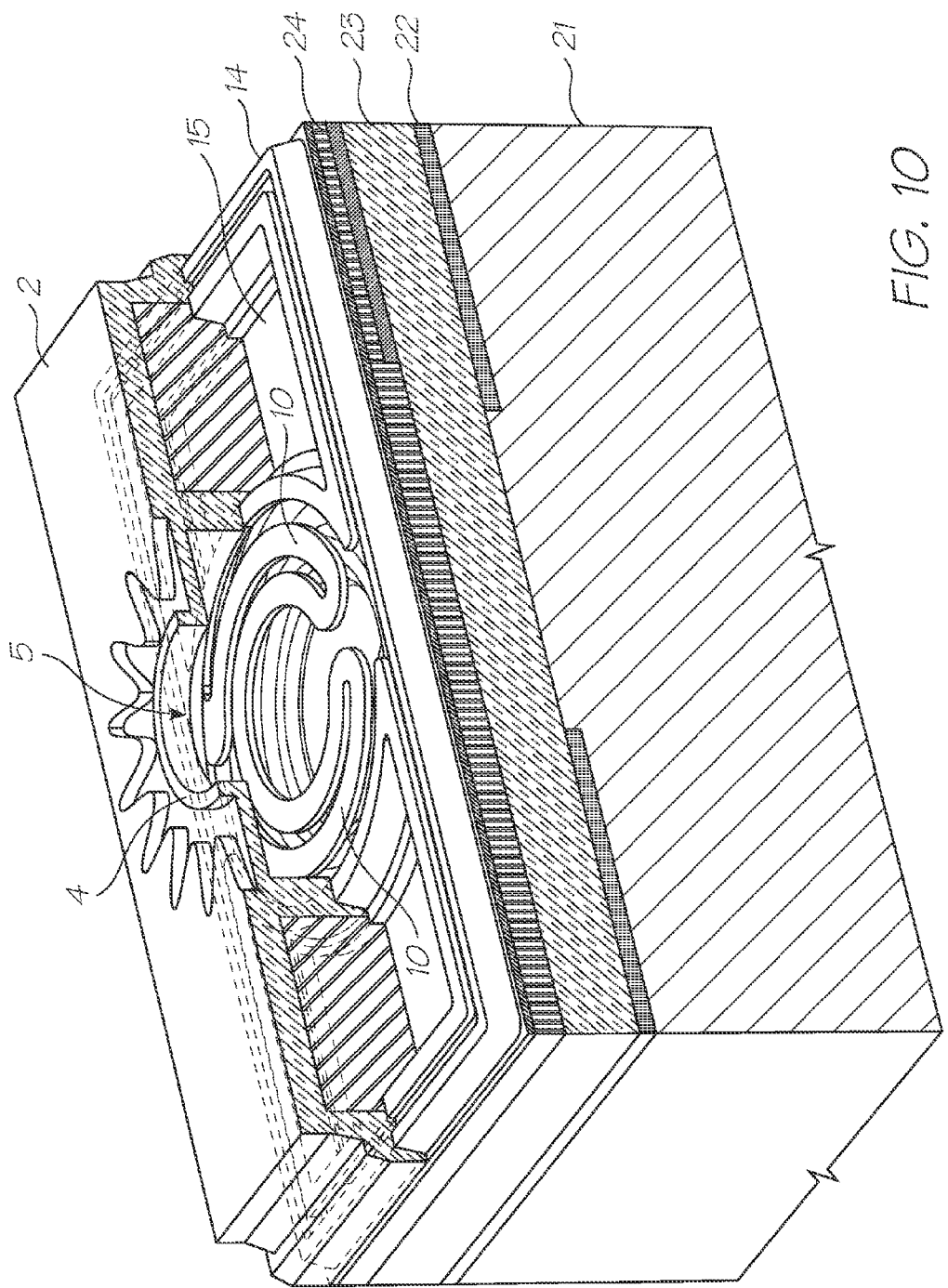
FIG. 10 is a schematic, partially cut away, perspective view of a further embodiment of a unit cell of a printhead.
Figure 11:
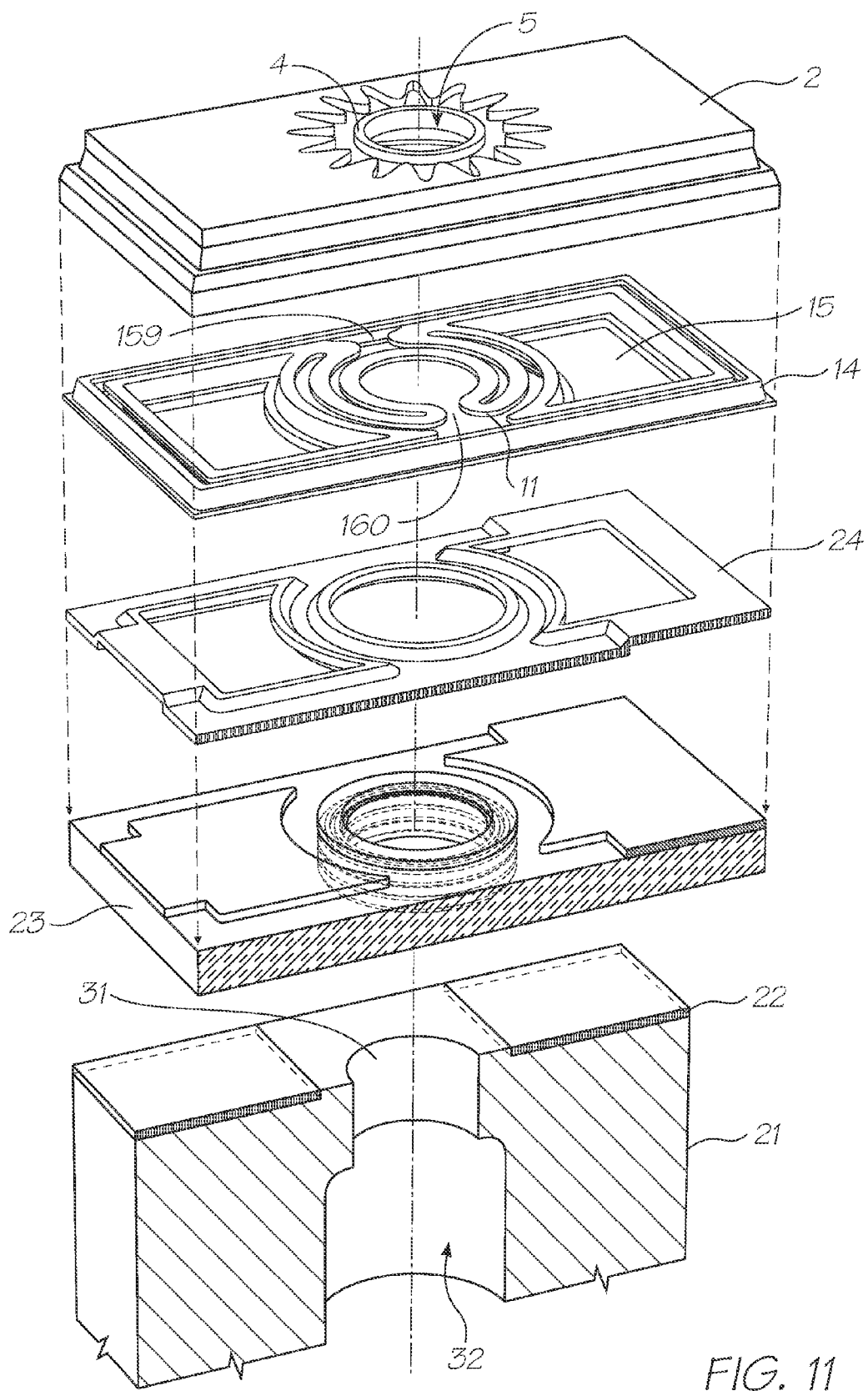
FIG. 11 is a schematic, partially cut away, exploded perspective view of the unit cell of FIG. 10.

Referring to FIGS. 10 and 11, the heater element 10 used in this unit cell 1 has a serpentine or 'double omega' shape. This configuration keeps the gas bubble centered on the axis of the nozzle. A single omega is a simple geometric shape which is beneficial from a fabrication perspective. However the gap 159 between the ends of the heater element means that the heating of the ink in the chamber is slightly asymmetrical. As a result, the gas bubble is slightly skewed to the side opposite the gap 159. This can in turn affect the trajectory of the ejected drop. The double omega shape provides the heater element with the gap 160 to compensate for the gap 159 so that the symmetry and position of the bubble within the chamber is better controlled and the ejected drop trajectory is more reliable.

Figure 12:
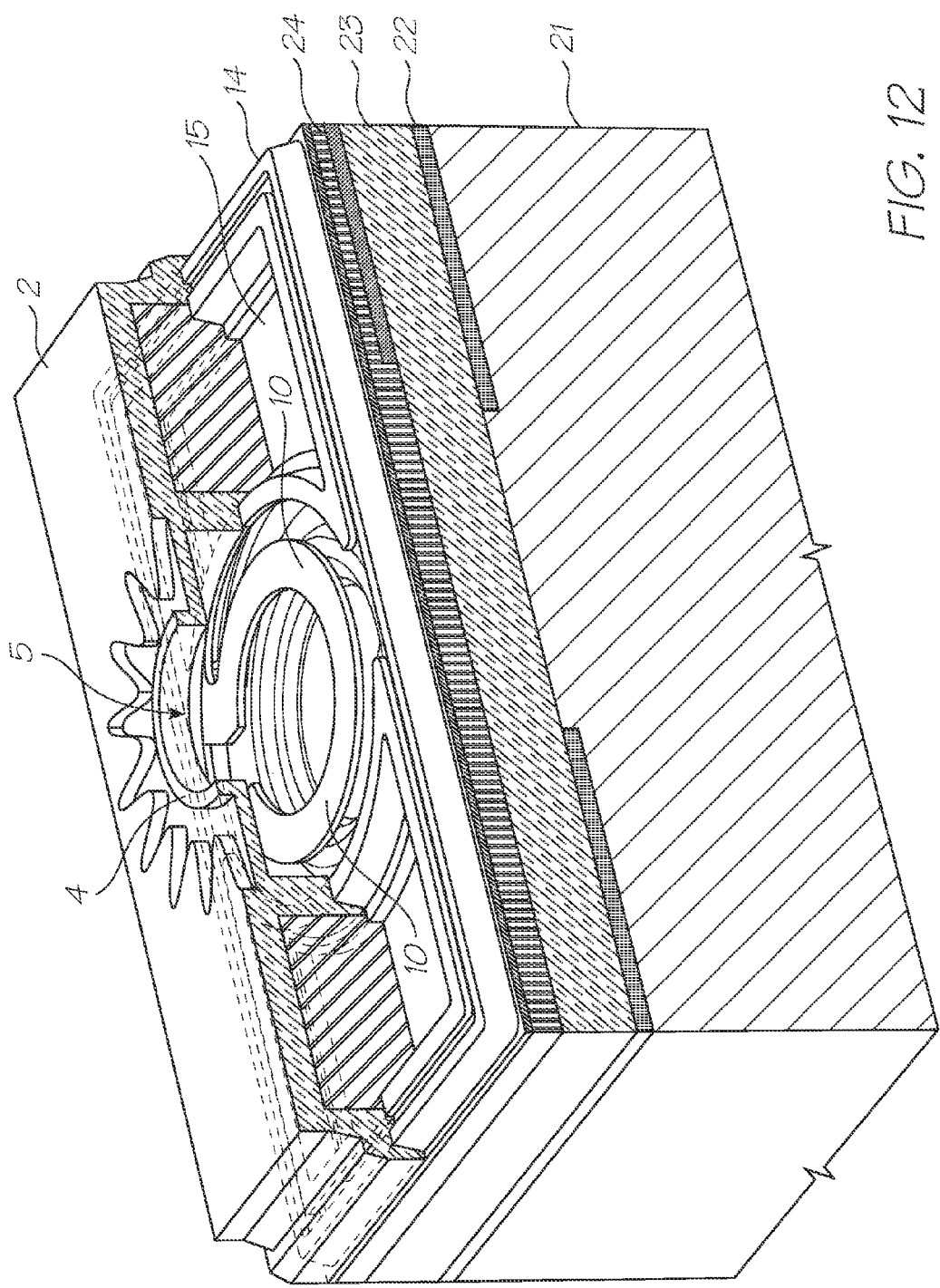
FIG. 12 is a schematic, partially cut away, perspective view of a further embodiment of a unit cell of a printhead.

FIG. 12 shows a heater element 10 with a single omega shape. As discussed above, the simplicity of this shape has significant advantages during lithographic fabrication. It can be a single current path that is relatively wide and therefore less affected by any inherent inaccuracies in the deposition of the heater material. The inherent inaccuracies of the equipment used to deposit the heater material result in variations in the dimensions of the element. However, these tolerances are fixed values so the resulting variations in the dimensions of a relatively wide component are proportionally less than the variations for a thinner component. It will be appreciated that proportionally large changes of components dimensions will have a greater effect on their intended function. Therefore the performance characteristics of a relatively wide heater element are more reliable than a thinner one.

The omega shape directs current flow around the axis of the nozzle aperture 5. This gives good bubble alignment with the aperture for better ejection of drops while ensuring that the bubble collapse point is not on the heater element 10. As discussed above, this avoids problems caused by cavitation.

Figure 27:
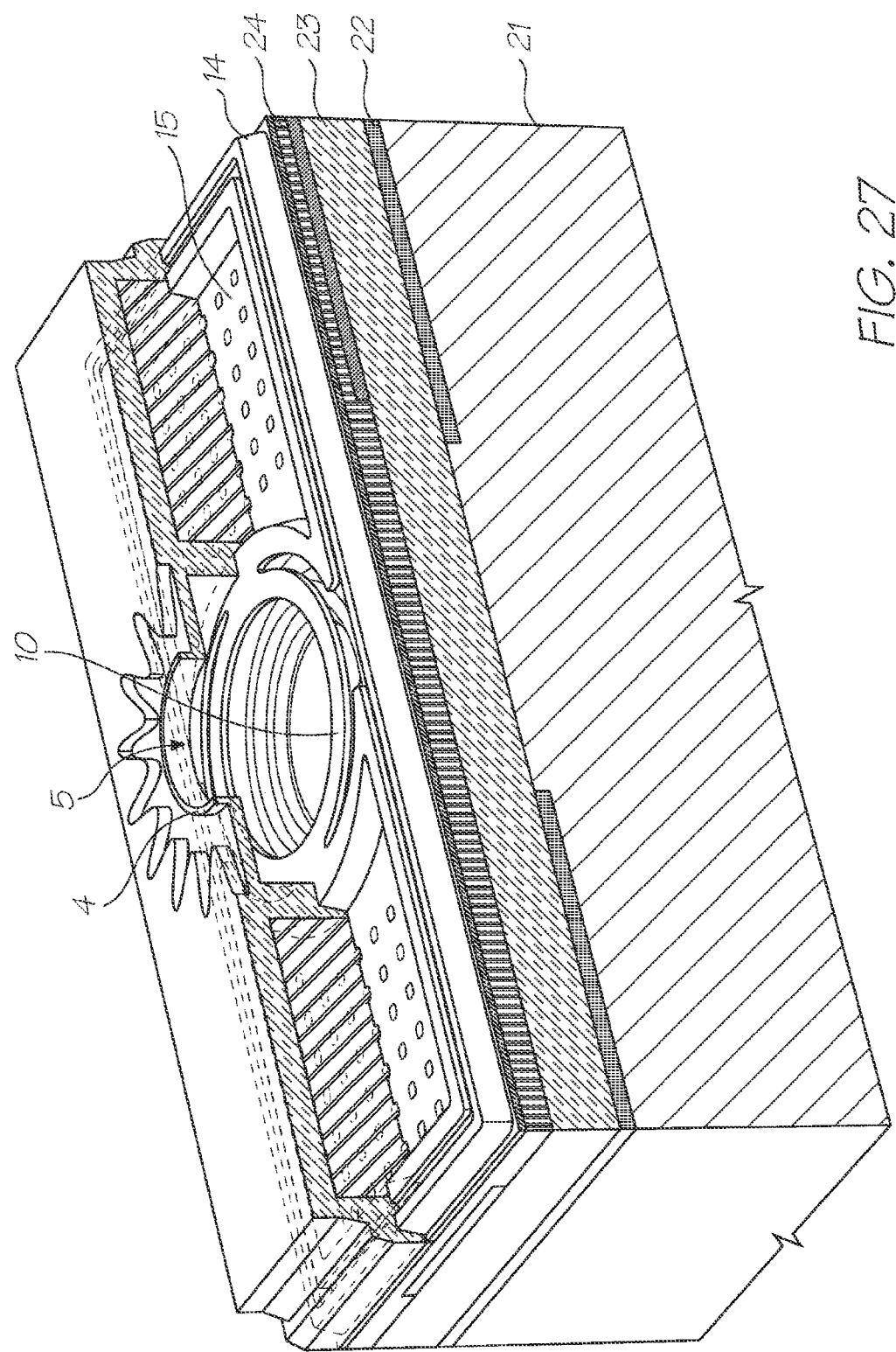
Figure 28:
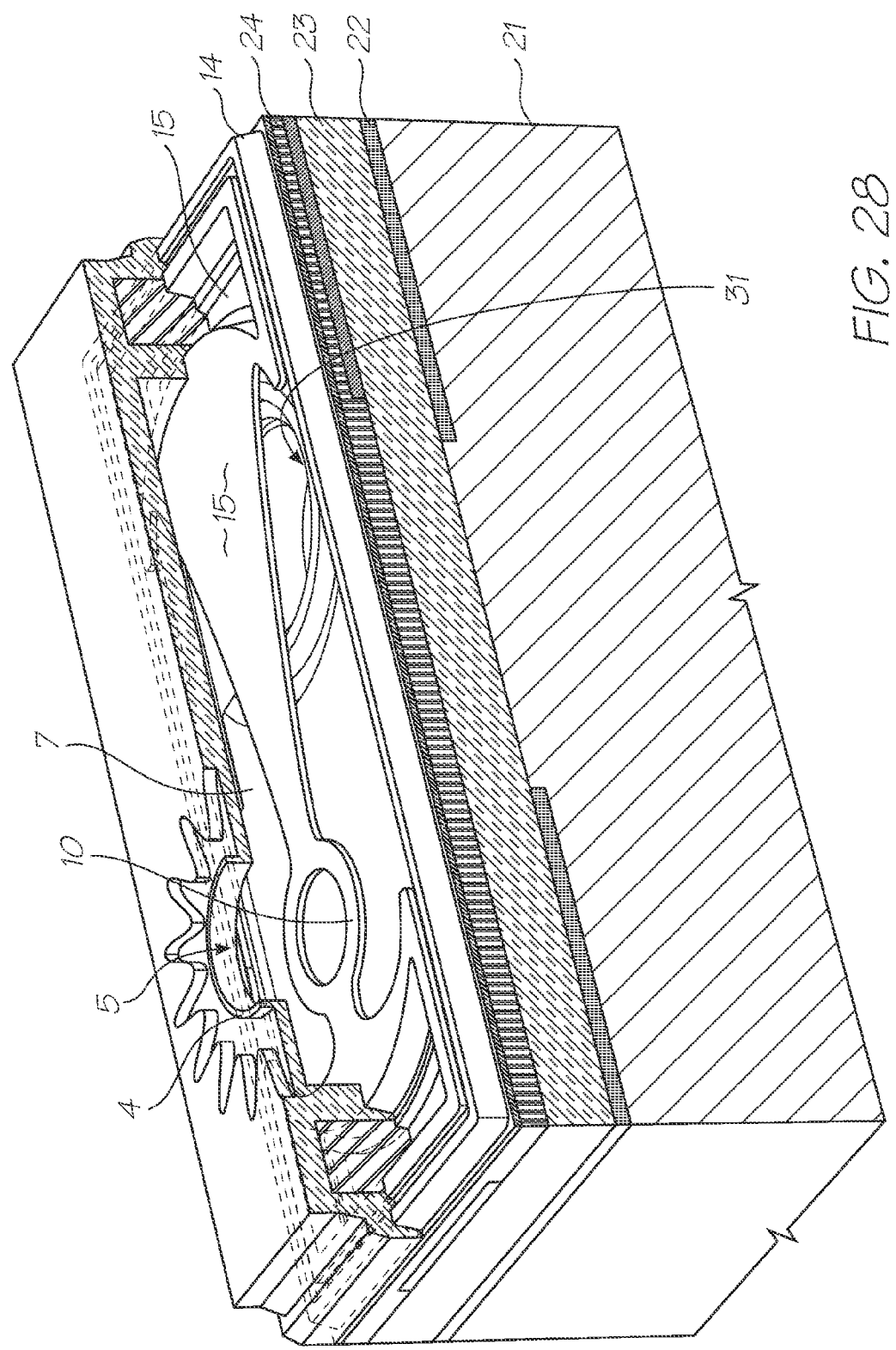
FIG. 28 is a schematic, partially cut away, perspective view of a further embodiment of a unit cell of a printhead.

Referring to FIGS. 13 to 26, another embodiment of the unit cell 1 is shown together with several stages of the etching and deposition fabrication process. In this embodiment, the heater element 10 is suspended from opposing sides of the chamber. This allows it to be symmetrical about two planes that intersect along the axis of the nozzle aperture 5. This configuration provides a drop trajectory along the axis of the nozzle aperture 5 while avoiding the cavitation problems discussed above. FIGS. 27 and 28 show other variations of this type of heater element 10.

FIG. 28 shows a unit cell 1 that has the nozzle aperture 5 and the heater element 10 offset from the center of the nozzle chamber 7. Consequently, the nozzle chamber 7 is larger than the previous embodiments. The heater 14 has two different electrodes 15 with the right hand electrode 15 extending well into the nozzle chamber 7 to support one side of the heater element 10. This reduces the area of the vias contacting the electrodes which can increase the electrode resistance and therefore the power losses. However, laterally offsetting the heater element from the ink inlet 31 increases the fluidic drag retarding flow back through the inlet 31 and ink supply passage 32. The fluidic drag through the nozzle aperture 5 comparatively much smaller so little energy is lost to a reverse flow of ink through the inlet when a gas bubble form on the element 10.

Figure 29:
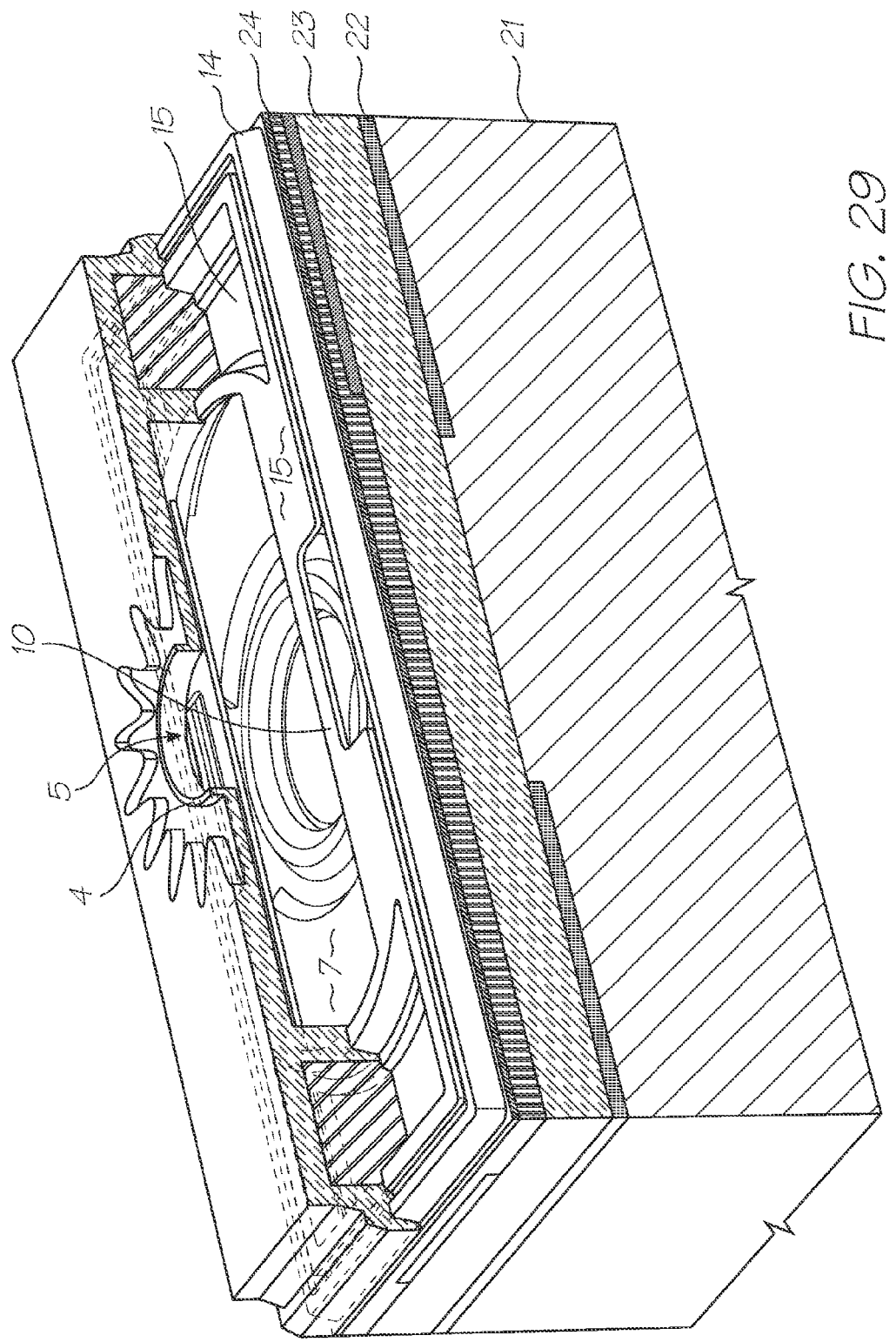
FIG. 29 is a schematic, partially cut away, perspective view of a further embodiment of a unit cell of a printhead.

The unit cell 1 shown in FIG. 29 also has a relatively large chamber 7 which again reduces the surface area of the electrodes in contact with the vias leading to the interconnect layer 23. However, the larger chamber 7 allows several heater elements 10 offset from the nozzle aperture 5. The arrangement shown uses two heater elements 10; one on either side of the chamber 7. Other designs use three or more elements in the chamber. Gas bubbles nucleate from opposing sides of the nozzle aperture and converge to form a single bubble. The bubble formed is symmetrical about at least one plane extending along the nozzle axis. This enhances the control of the symmetry and position of the bubble within the chamber 7 and therefore the ejected drop trajectory is more reliable.

Fabrication Process

Figure 13:
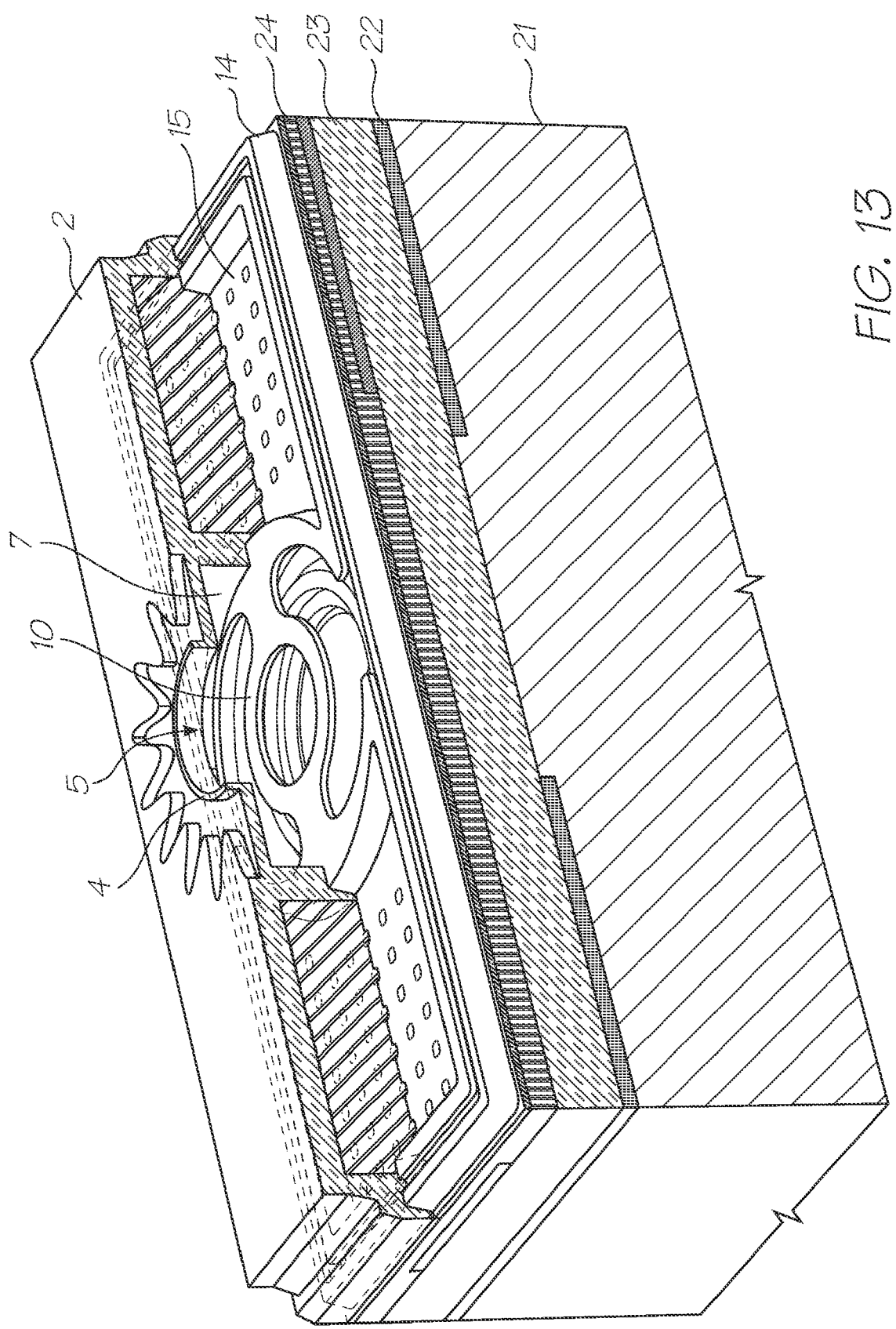
FIG. 13 is a schematic, partially cut away, perspective view of a further embodiment of a unit cell of a printhead.

In the interests of brevity, the fabrication stages have been shown for the unit cell of FIG. 13 only (see FIGS. 15 to 25). It will be appreciated that the other unit cells will use the same fabrication stages with different masking.

Referring to FIG. 15, there is shown the starting point for fabrication of the thermal inkjet nozzle shown in FIG. 13. CMOS processing of a silicon wafer provides a silicon substrate 21 having drive circuitry 22, and an interlayer dielectric ("interconnect") 23. The interconnect 23 comprises four metal layers, which together form a seal ring for the inlet passage 9 to be etched through the interconnect. The top metal layer 26, which forms an upper portion of the seal ring, can be seen in FIG. 15. The metal seal ring prevents ink moisture from seeping into the interconnect 23 when the inlet passage 9 is filled with ink.

A passivation layer 24 is deposited onto the top metal layer 26 by plasma-enhanced chemical vapour deposition (PECVD). After deposition of the passivation layer 24, it is etched to define a circular recess, which forms parts of the inlet passage 9. At the same as etching the recess, a plurality of vias 50 are also etched, which allow electrical connection through the passivation layer 24 to the top metal layer 26. The etch pattern is defined by a layer of patterned photoresist (not shown), which is removed by $O_2$ ashing after the etch.

Figure 16:
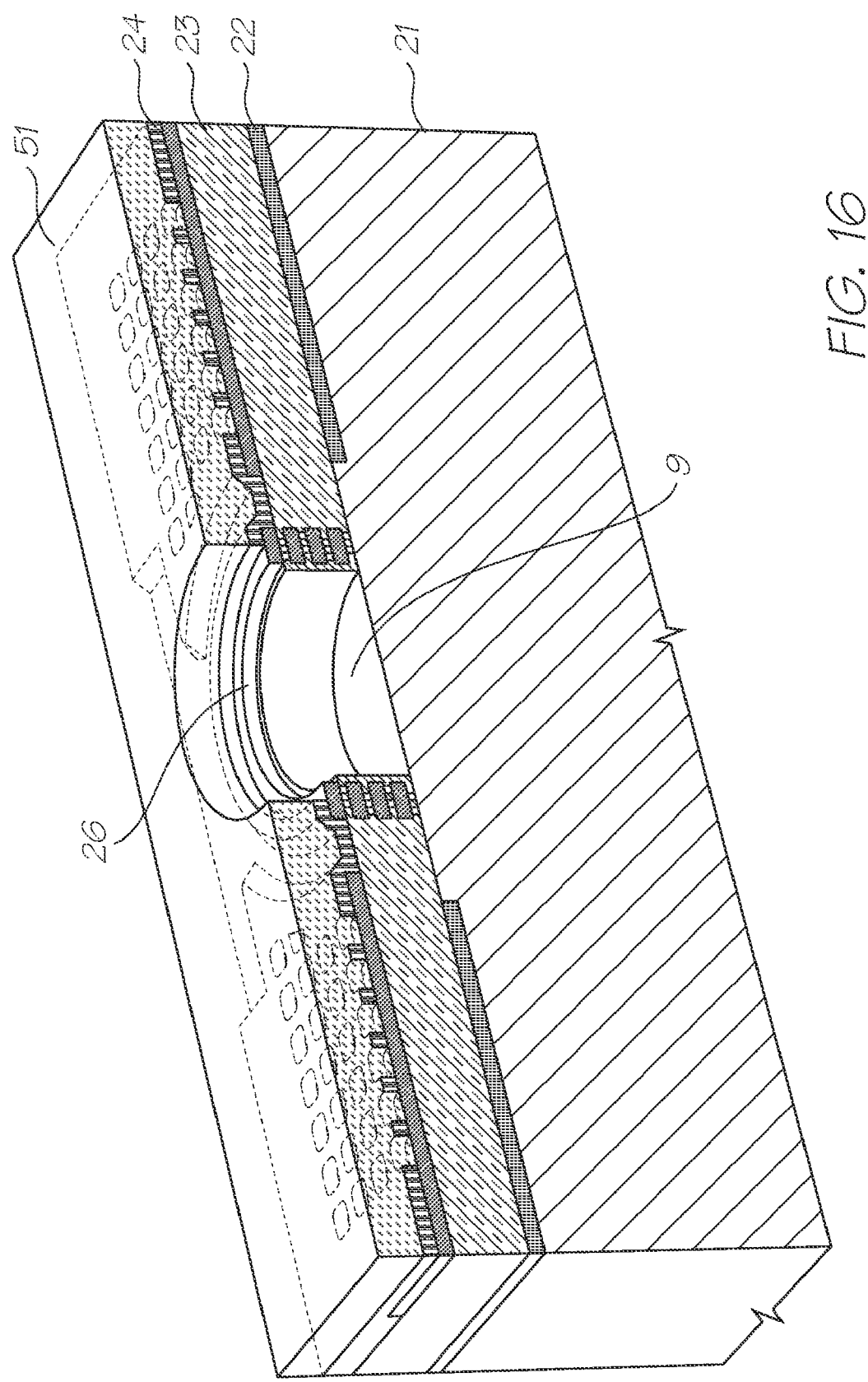
Figure 17:
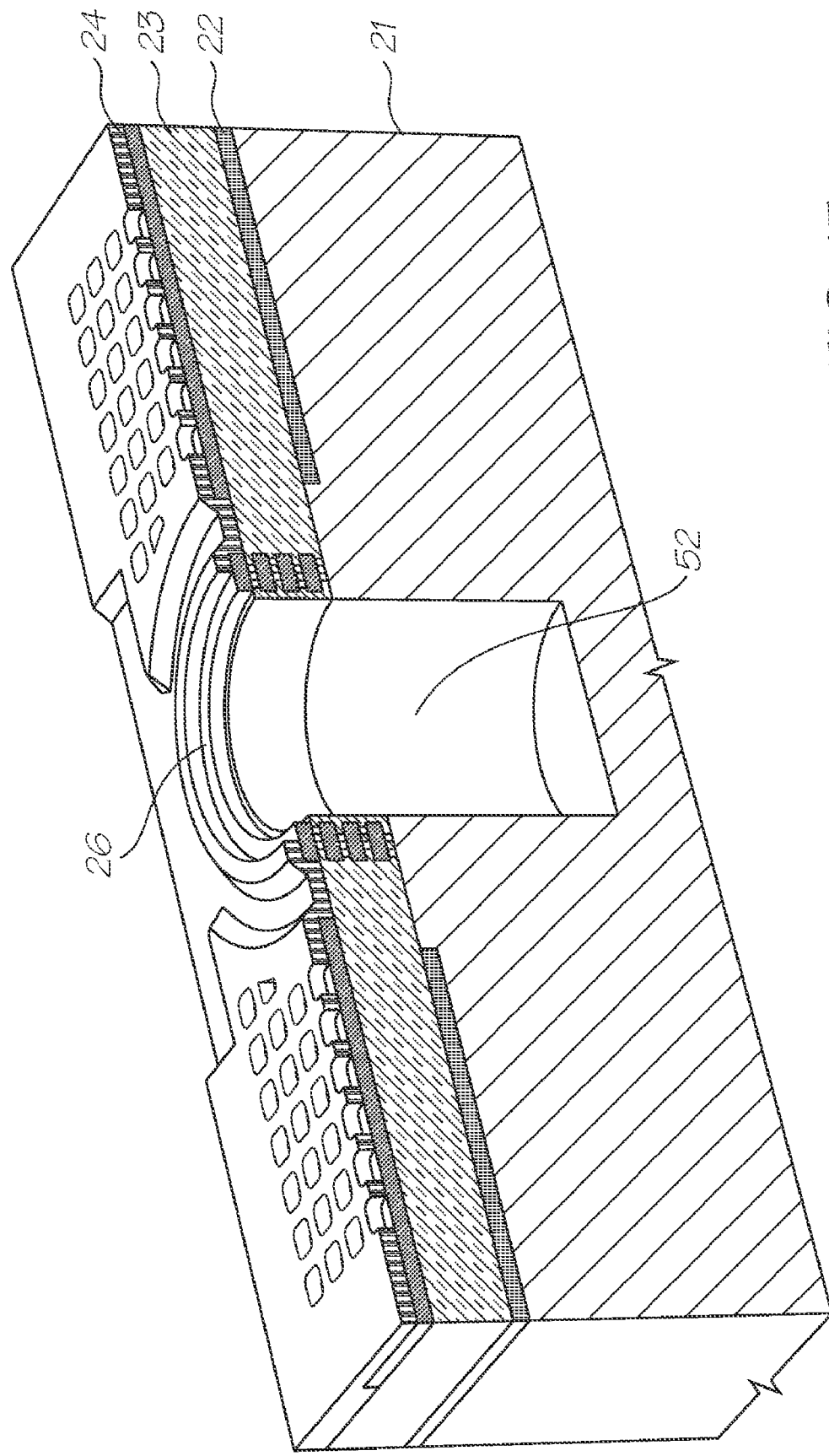

Referring to FIG. 16, in the next fabrication sequence, a layer of photoresist is spun onto the passivation later 24. The photoresist is exposed and developed to define a circular opening. With the patterned photoresist 51 in place, the dielectric interconnect 23 is etched as far as the silicon substrate 21 using a suitable oxide-etching gas chemistry (e.g. $O_2/C_4F_8$). Etching through the silicon substrate is continued down to about 20 microns to define a front ink hole 52, using a suitable silicon-etching gas chemistry (e.g. 'Bosch etch'). The same photoresist mask 51 can be used for both etching steps. FIG. 17 shows the unit cell after etching the front ink hole 52 and removal of the photoresist 51.

Figure 18:
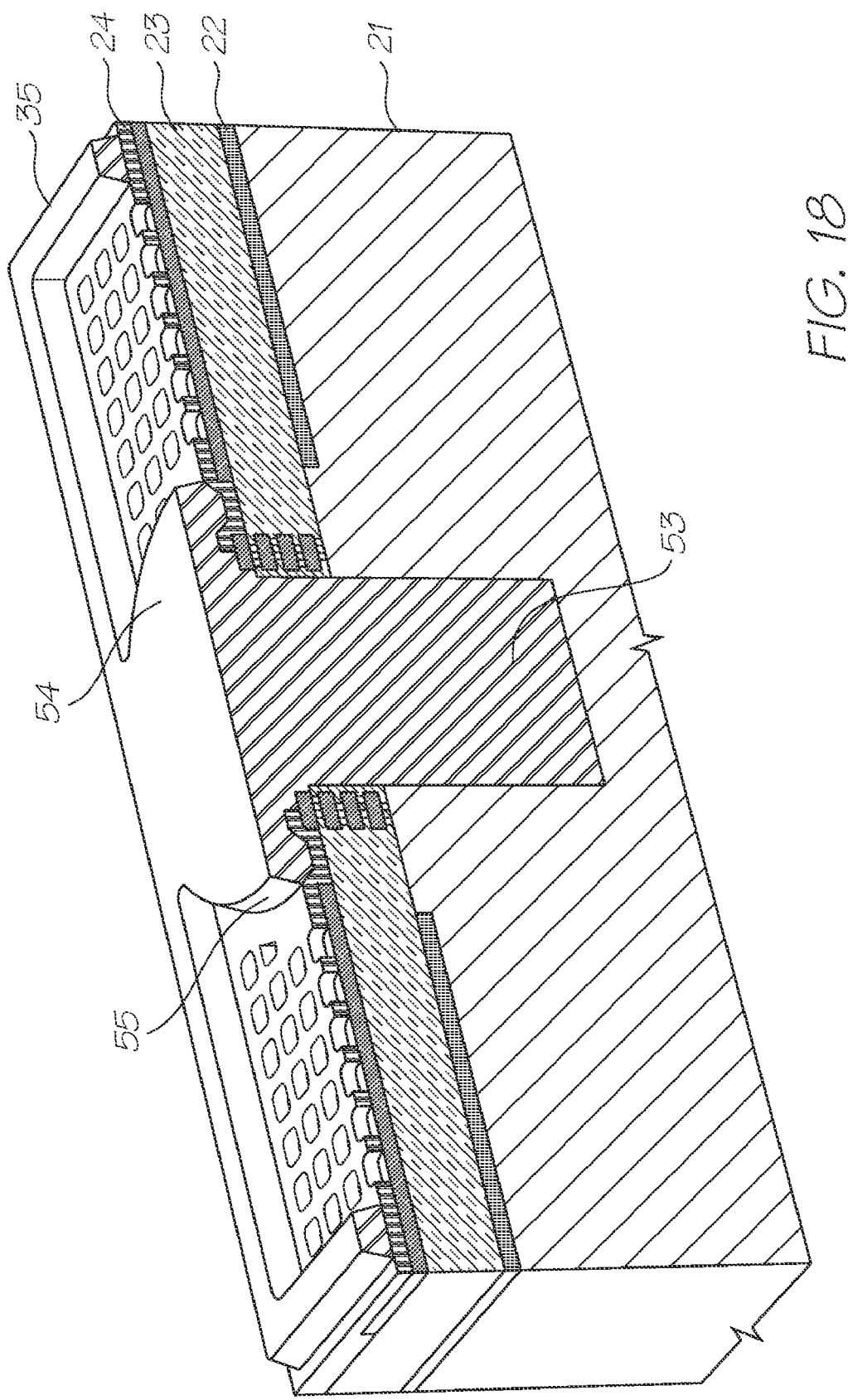

Referring to FIG. 18, in the next stage of fabrication, the front ink hole 52 is plugged with photoresist to provide a front plug 53. At the same time, a layer of photoresist is deposited over the passivation layer 24. This layer of photoresist is exposed and developed to define a first sacrificial scaffold 54 over the front plug 53, and scaffolding tracks 35 around the perimeter of the unit cell. The first sacrificial scaffold 54 is used for subsequent deposition of heater material 38 thereon and is therefore formed with a planar upper surface to avoid any buckling in the heater element (see heater element 10 in FIG. 13). The first sacrificial scaffold 54 is UV cured and hardbaked to prevent reflow of the photoresist during subsequent high-temperature deposition onto its upper surface.

Importantly, the first sacrificial scaffold 54 has sloped side faces 55. These sloped side faces 55 are formed by adjusting the focusing in the exposure tool (e.g. stepper) when exposing the photoresist. The sloped side faces 55 advantageously allow heater material 38 to be deposited substantially evenly over the first sacrificial scaffold 54.

Figure 19:
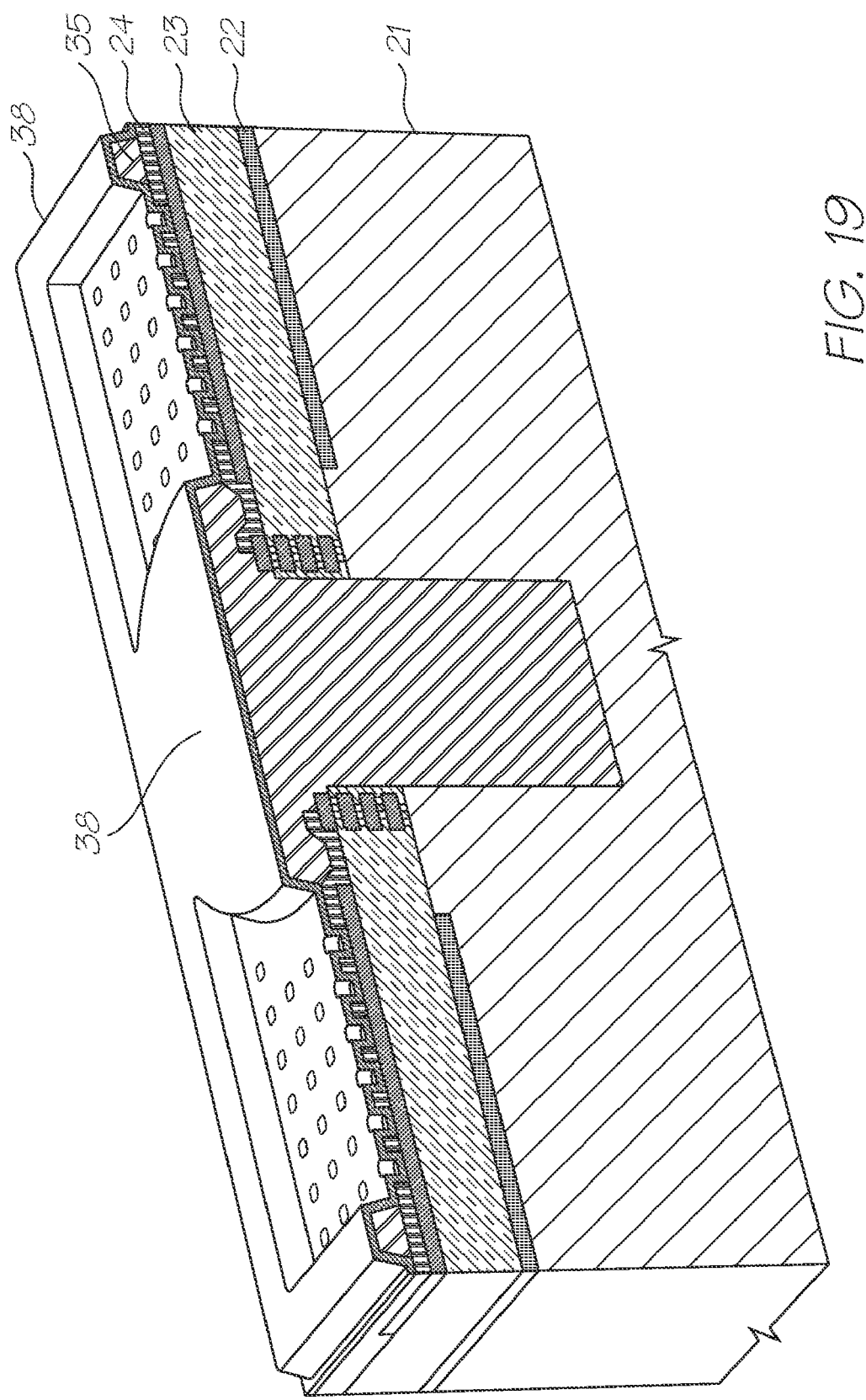

Referring to FIG. 19, the next stage of fabrication deposits the heater material 38 over the first sacrificial scaffold 54, the passivation layer 24 and the perimeter scaffolding tracks 35. The heater material 38 is typically comprised of TiAlN. The heater element 10 may be formed from a monolayer of the heater material 38. However, the heater element 10 may alternatively comprise the heater material sandwiched between upper and lower passivation films, such as tantalum, tantalum nitride or silicon nitride films. Passivation films covering the heater element 10 minimize corrosion and improve heater longevity.

Figure 20:
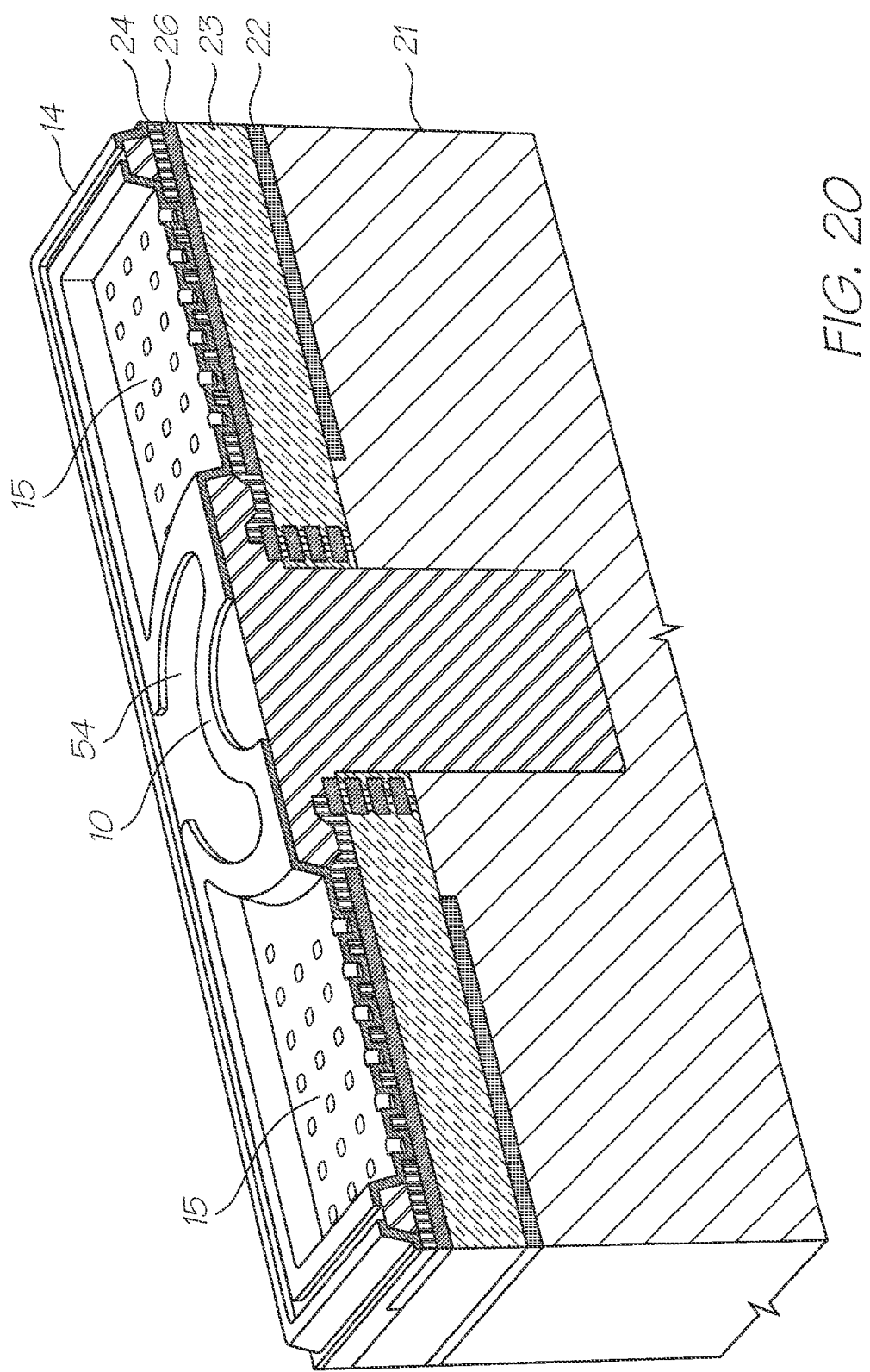

Referring to FIG. 20, the heater material 38 is subsequently etched down to the first sacrificial scaffold 54 to define the heater element 10. At the same time, contact electrodes 15 are defined on either side of the heater element 10. The electrodes 15 are in contact with the top metal layer 26 and so provide electrical connection between the CMOS and the heater element 10. The sloped side faces of the first sacrificial scaffold 54 ensure good electrical connection between the heater element 10 and the electrodes 15, since the heater material is deposited with sufficient thickness around the scaffold 54. Any thin areas of heater material (due to insufficient side face deposition) would increase resistivity and affect heater performance.

Adjacent unit cells are electrically insulated from each other by virtue of grooves etched around the perimeter of each unit cell. The grooves are etched at the same time as defining the heater element 10.

Figure 21:
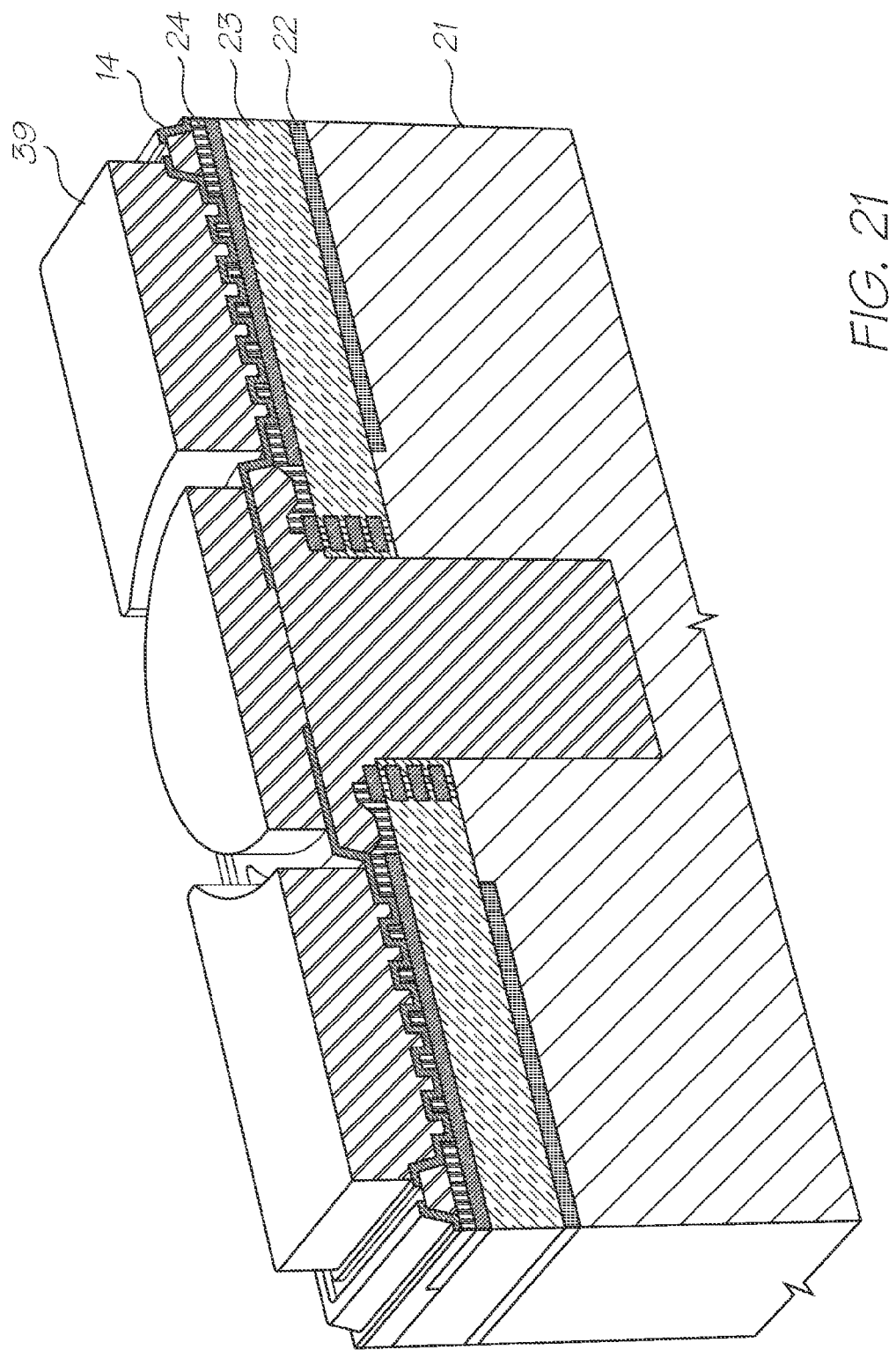

Referring to FIG. 21, in the subsequent step a second sacrificial scaffold 39 of photoresist is deposited over the heater material. The second sacrificial scaffold 39 is exposed and developed to define sidewalls for the cylindrical nozzle chamber and perimeter sidewalls for each unit cell. The second sacrificial scaffold 39 is also UV cured and hardbaked to prevent any reflow of the photoresist during subsequent high-temperature deposition of the silicon nitride roof material.

Figure 22:
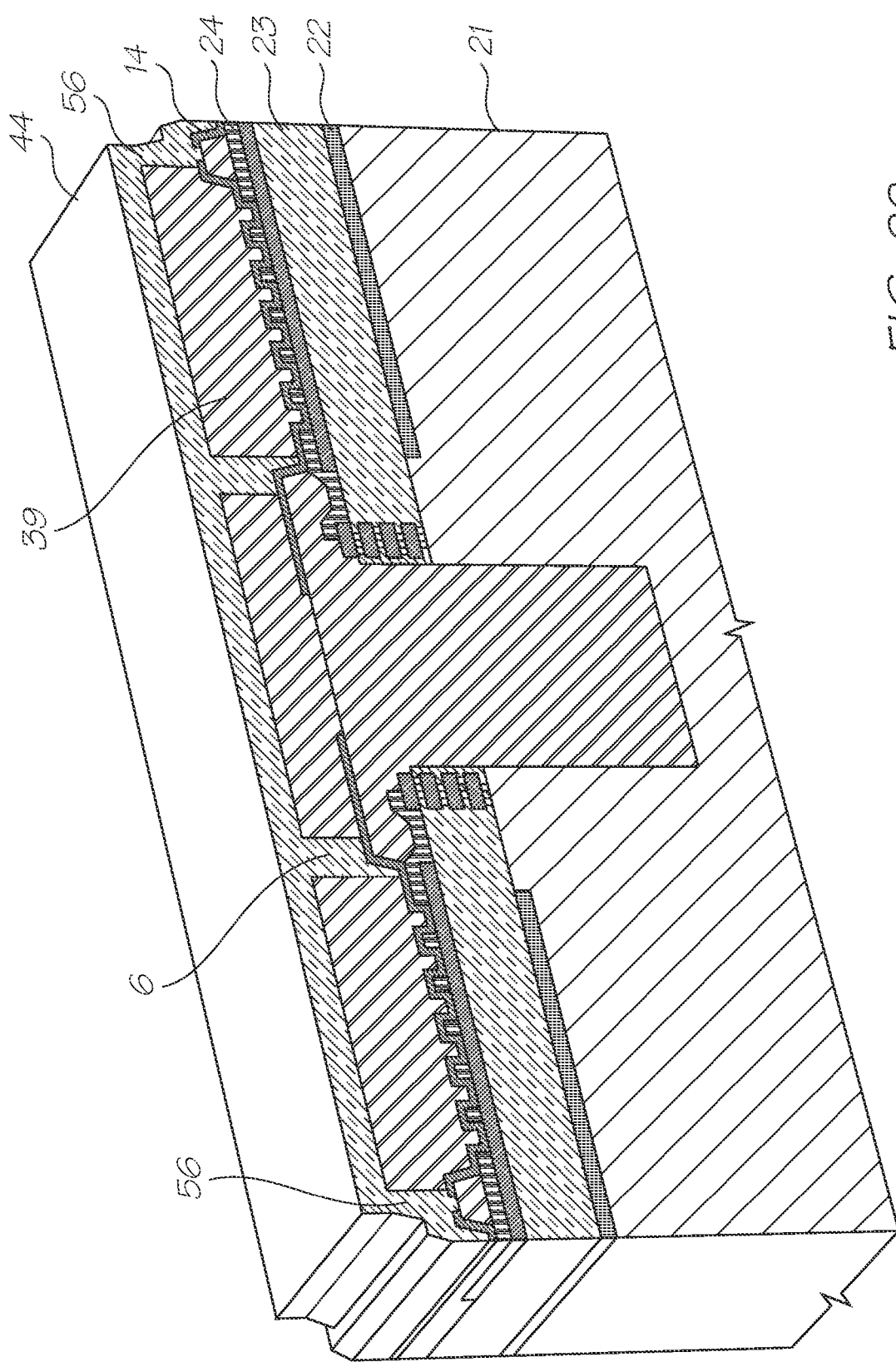

Referring to FIG. 22, silicon nitride is deposited onto the second sacrificial scaffold 39 by plasma enhanced chemical vapour deposition. The silicon nitride forms a roof 44 over each unit cell, which is the nozzle plate 2 for a row of nozzles. Chamber sidewalls 6 and unit cell sidewalls 56 are also formed by deposition of silicon nitride.

Figure 23:
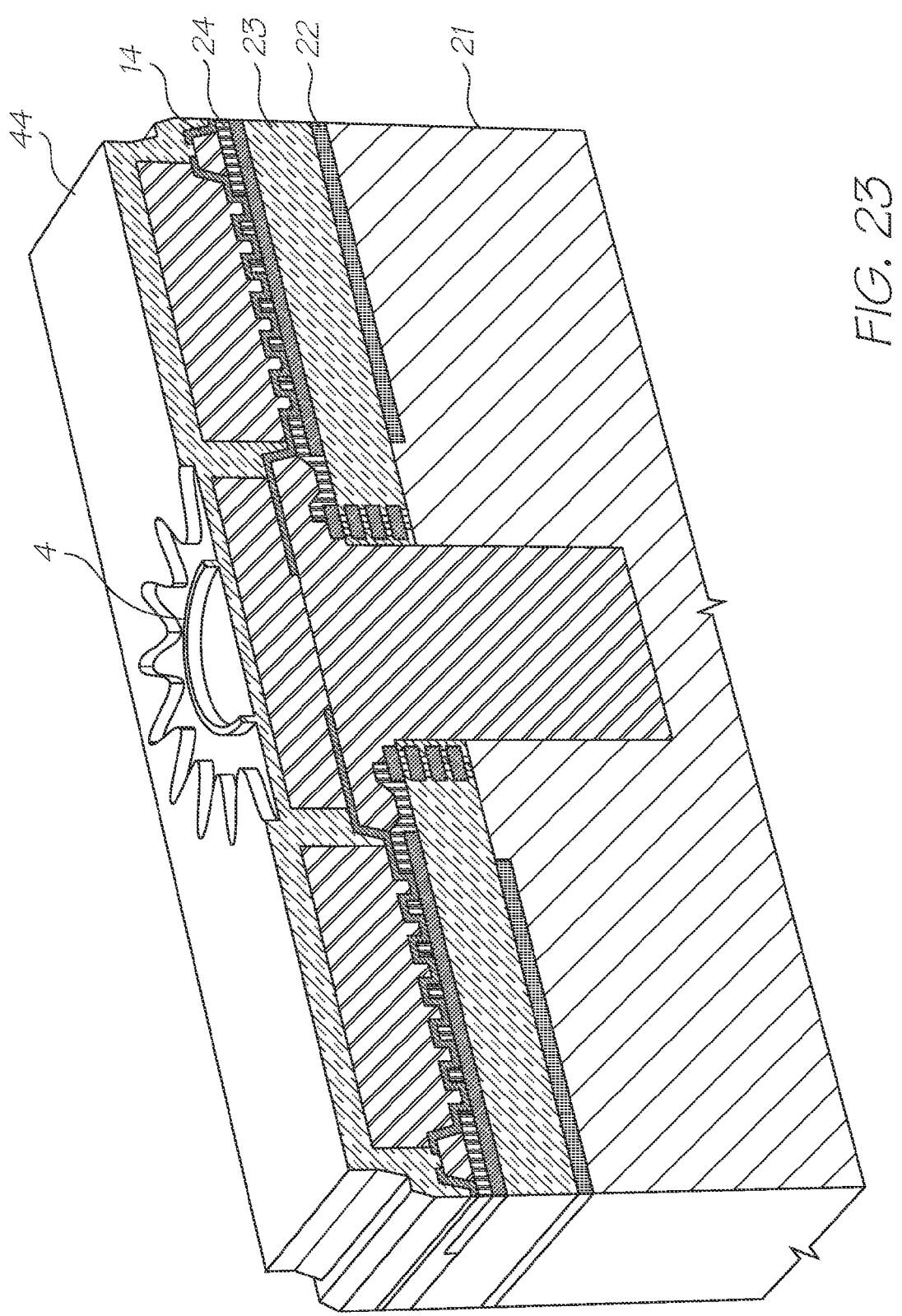

Referring to FIG. 23, the nozzle rim 4 is etched partially through the roof 44, by placing a suitably patterned photoresist mask over the roof, etching for a controlled period of time and removing the photoresist by ashing.

Figure 24:
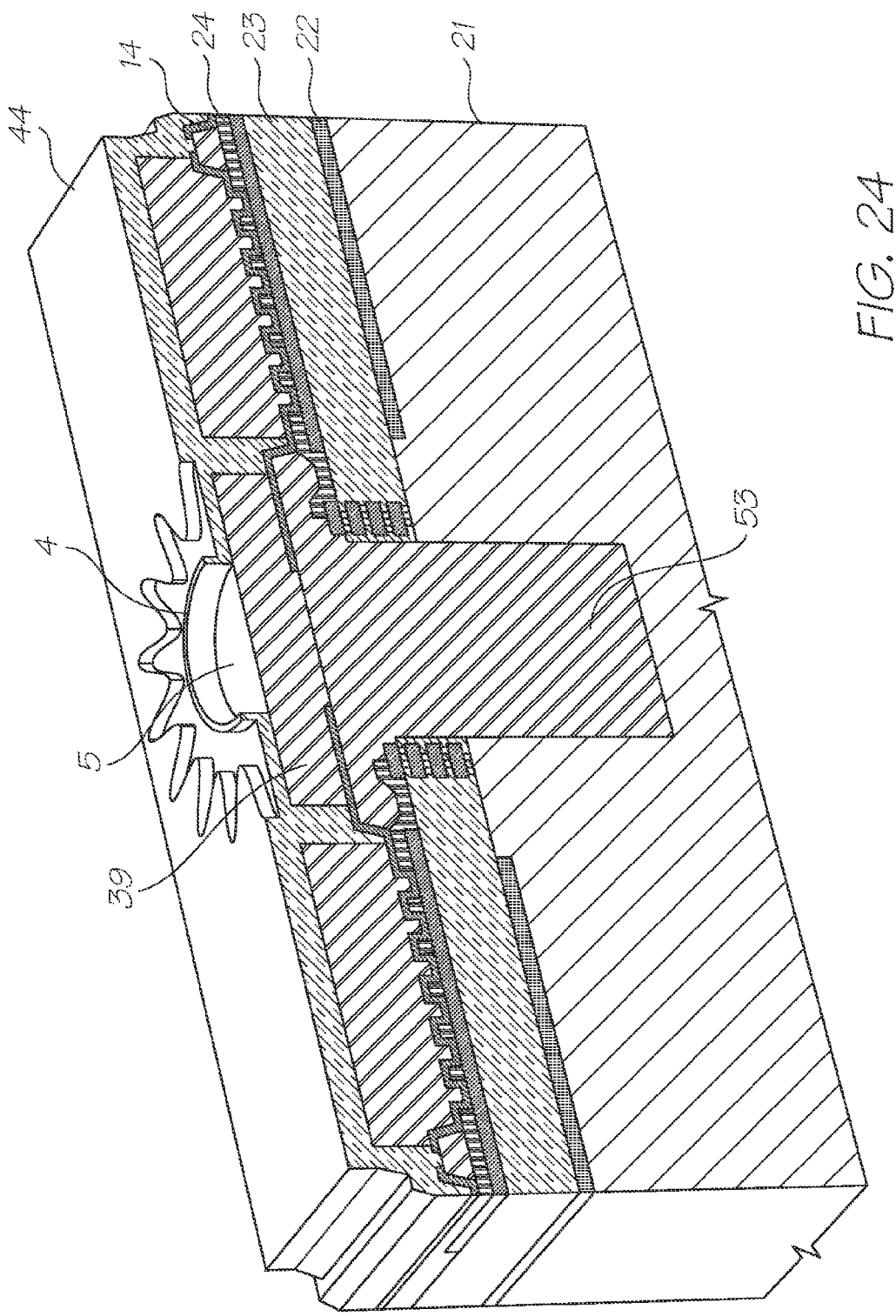

Referring to FIG. 24, the nozzle aperture 5 is etched through the roof 24 down to the second sacrificial scaffold 39. Again, the etch is performed by placing a suitably patterned photoresist mask over the roof, etching down to the scaffold 39 and removing the photoresist mask.

With the nozzle structure now fully formed on a frontside of the silicon substrate 21, an ink supply channel 32 is etched from the backside of the substrate 21, which meets with the front plug 53.

Figure 25:
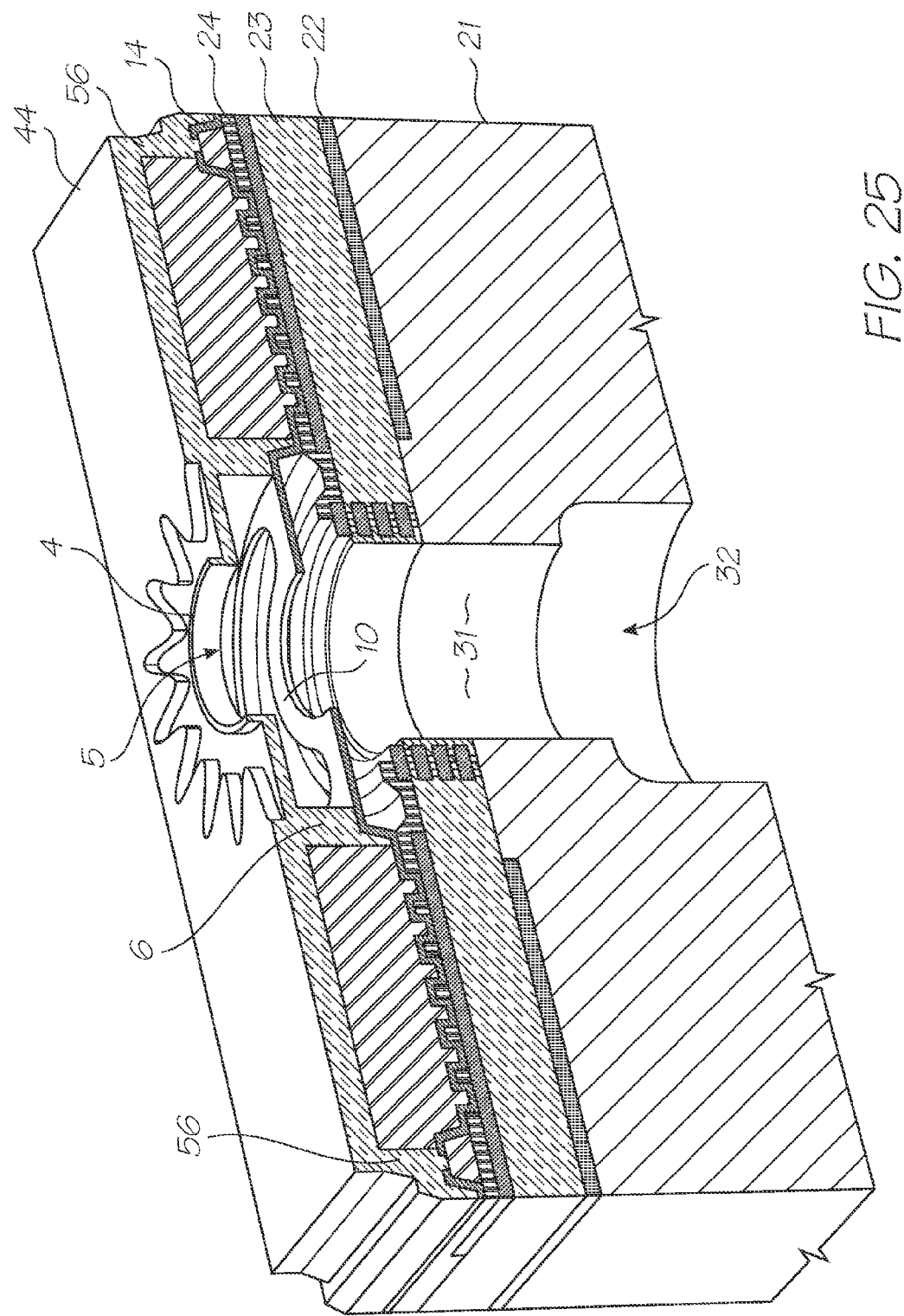
Figure 26:
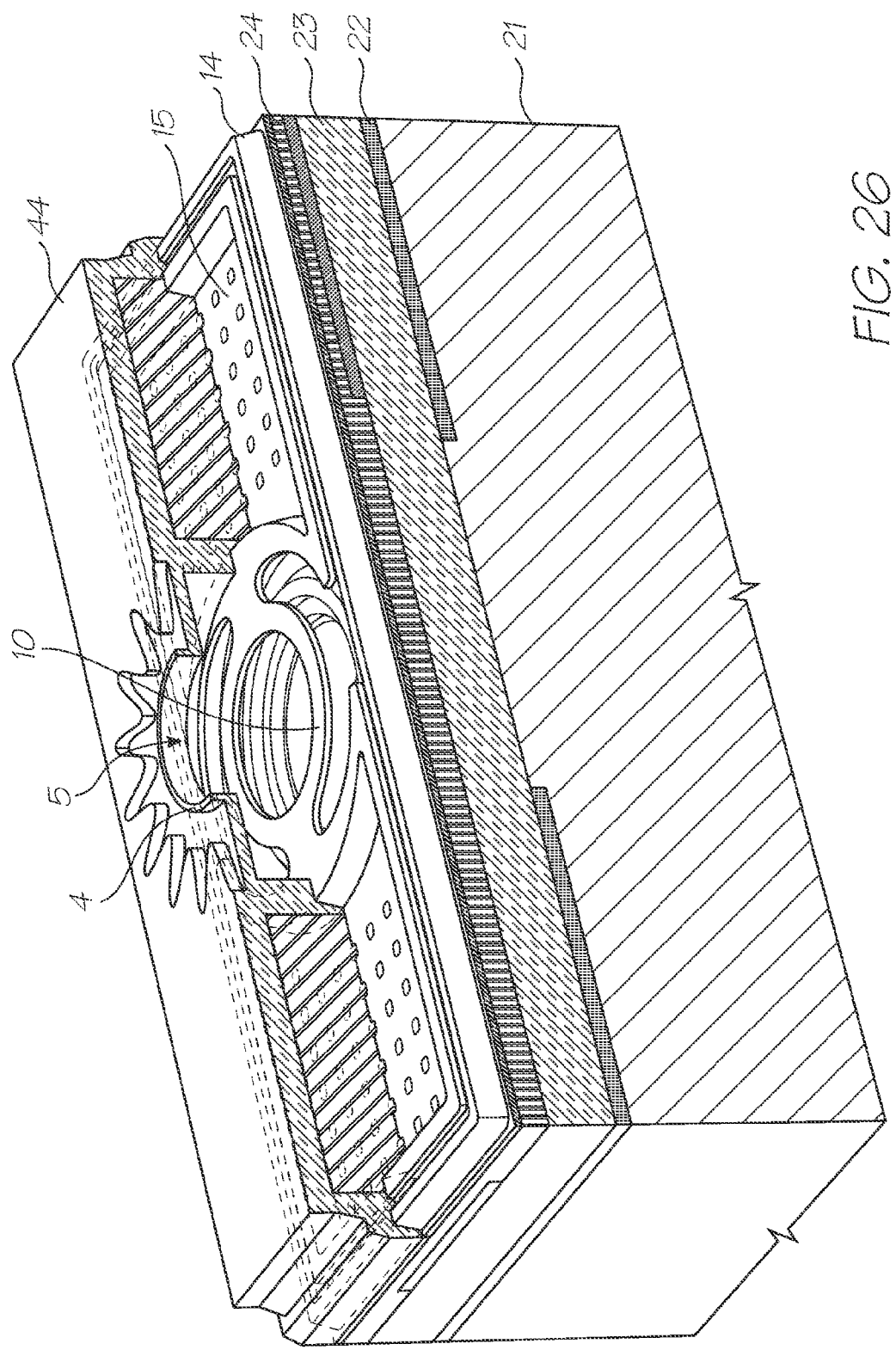
FIGS. 26 and 27 show schematic, partially cut away, schematic perspective views of two variations of the unit cell of FIGS. 13 to 25.

Referring to FIG. 25, after formation of the ink supply channel 32, the first and second sacrificial scaffolds of photoresist, together with the front plug 53 are ashed off using an $O_2$ plasma. Accordingly, fluid connection is made from the ink supply channel 32 through to the nozzle aperture 5.

It should be noted that a portion of photoresist, on either side of the nozzle chamber sidewalls 6, remains encapsulated by the roof 44, the unit cell sidewalls 56 and the chamber sidewalls 6. This portion of photoresist is sealed from the $O_2$ ashing plasma and, therefore, remains intact after fabrication of the printhead. This encapsulated photoresist advantageously provides additional robustness for the printhead by supporting the nozzle plate 2. Hence, the printhead has a robust nozzle plate spanning continuously over rows of nozzles, and being supported by solid blocks of hardened photoresist, in addition to support walls.

Other Embodiments

The invention has been described above with reference to printheads using thermal bend actuators and bubble forming heater elements. However, it is potentially suited to a wide range of printing system including: color and monochrome office printers, short run digital printers, high speed digital printers, offset press supplemental printers, low cost scanning printers high speed pagewidth printers, notebook computers with inbuilt pagewidth printers, portable color and monochrome printers, color and monochrome copiers, color and monochrome facsimile machines, combined printer, facsimile and copying machines, label printers, large format plotters, photograph copiers, printers for digital photographic "minilabs", video printers, PHOTO CD (PHOTO CD is a registered trade mark of the Eastman Kodak Company) printers, portable printers for PDAs, wallpaper printers, indoor sign printers, billboard printers, fabric printers, camera printers and fault tolerant commercial printer arrays.

It will be appreciated by ordinary workers in this field that numerous variations and/or modifications may be made to the present invention as shown in the specific embodiments without departing from the spirit or scope of the invention as broadly described. The present embodiments are, therefore, to be considered in all respects to be illustrative and not restrictive.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. In conventional thermal inkjet printheads, this leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per printhead, but is a major impediment to the fabrication of pagewidth printheads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:
 low power (less than 10 Watts)
 high resolution capability (1,600 dpi or more)
 photographic quality output
 low manufacturing cost
 small size (pagewidth times minimum cross section)
 high speed (<2 seconds per page).

All of these features can be met or exceeded by the ink jet systems described below with differing levels of difficulty. Forty-five different ink jet technologies have been developed by the Assignee to give a wide range of choices for high volume manufacture. These technologies form part of separate applications assigned to the present Assignee as set out in the table under the heading Cross References to Related Applications.

The ink jet designs shown here are suitable for a wide range of digital printing systems, from battery powered one-time use digital cameras, through to desktop and network printers, and through to commercial printing systems.

For ease of manufacture using standard process equipment, the printhead is designed to be a monolithic 0.5 micron CMOS chip with MEMS post processing. For color photographic applications, the printhead is 100 mm long, with a width which depends upon the ink jet type. The smallest printhead designed is IJ38, which is 0.35 mm wide, giving a chip area of 35 square mm. The printheads each contain 19,200 nozzles plus data and control circuitry.

Ink is supplied to the back of the printhead by injection molded plastic ink channels. The molding requires 50 micron features, which can be created using a lithographically micromachined insert in a standard injection molding tool. Ink flows through holes etched through the wafer to the nozzle chambers fabricated on the front surface of the wafer. The printhead is connected to the camera circuitry by tape automated bonding.

Tables of Drop-on-Demand Ink Jets

Eleven important characteristics of the fundamental operation of individual ink jet nozzles have been identified. These characteristics are largely orthogonal, and so can be elucidated as an eleven dimensional matrix. Most of the eleven axes of this matrix include entries developed by the present assignee.

The following tables form the axes of an eleven dimensional table of ink jet types.
 Actuator mechanism (18 types)
 Basic operation mode (7 types)
 Auxiliary mechanism (8 types)
 Actuator amplification or modification method (17 types)
 Actuator motion (19 types)
 Nozzle refill method (4 types)
 Method of restricting back-flow through inlet (10 types)
 Nozzle clearing method (9 types)
 Nozzle plate construction (9 types)
 Drop ejection direction (5 types)
 Ink type (7 types)

The complete eleven dimensional table represented by these axes contains 36.9 billion possible configurations of ink jet nozzle. While not all of the possible combinations result in a viable ink jet technology, many million configurations are viable. It is clearly impractical to elucidate all of the possible configurations. Instead, certain ink jet types have been investigated in detail. These are designated IJ01 to IJ45 above which matches the docket numbers in the table under the heading Cross References to Related Applications.

Other ink jet configurations can readily be derived from these forty-five examples by substituting alternative configurations along one or more of the 11 axes. Most of the IJ01 to IJ45 examples can be made into ink jet printheads with characteristics superior to any currently available ink jet technology.

Where there are prior art examples known to the inventor, one or more of these examples are listed in the examples column of the tables below. The IJ01 to IJ45 series are also listed in the examples column. In some cases, print technology may be listed more than once in a table, where it shares characteristics with more than one entry.

Suitable applications for the ink jet technologies include: Home printers, Office network printers, Short run digital printers, Commercial print systems, Fabric printers, Pocket printers, Internet WWW printers, Video printers, Medical imaging, Wide format printers, Notebook PC printers, Fax machines, Industrial printing systems, Photocopiers, Photographic minilabs etc.

The information associated with the aforementioned 11 dimensional matrix are set out in the following tables.

| | ACTUATOR MECHANISM (APPLIED ONLY TO SELECTED INK DROPS) | | | |
|---|---|---|---|---|
| | Description | Advantages | Disadvantages | Examples |
| Thermal bubble | An electrothermal heater heats the ink to above boiling point, transferring significant heat to the aqueous ink. A bubble nucleates and quickly forms, expelling the ink. The efficiency of the process is low, with typically less than 0.05% of the electrical energy being transformed into kinetic energy of the drop. | Large force generated Simple construction No moving parts Fast operation Small chip area required for actuator | High power Ink carrier limited to water Low efficiency High temperatures required High mechanical stress Unusual materials required Large drive transistors Cavitation causes actuator failure Kogation reduces bubble formation Large print heads are difficult to fabricate | Canon Bubblejet 1979 Endo et al GB patent 2,007,162 Xerox heater-in-pit 1990 Hawkins et al U.S. Pat. No. 4,899,181 Hewlett-Packard TIJ 1982 Vaught et al U.S. Pat. No. 4,490,728 |
| Piezo-electric | A piezoelectric crystal such as lead lanthanum zirconate (PZT) is electrically activated, and either expands, shears, or bends to apply pressure to the ink, ejecting drops. | Low power consumption Many ink types can be used Fast operation High efficiency | Very large area required for actuator Difficult to integrate with electronics High voltage drive transistors required Full pagewidth print heads impractical due to actuator size Requires electrical poling in high field strengths during manufacture | Kyser et al U.S. Pat. No. 3,946,398 Zoltan U.S. Pat. No. 3,683,212 1973 Stemme U.S. Pat. No. 3,747,120 Epson Stylus Tektronix IJ04 |
| Electro-strictive | An electric field is used to activate electrostriction in relaxor materials such as lead lanthanum zirconate titanate (PLZT) or lead magnesium niobate (PMN). | Low power consumption Many ink types can be used Low thermal expansion Electric field strength required (approx. 3.5 V/μm) can be | Low maximum strain (approx. 0.01%) Large area required for actuator due to low strain Response speed is marginal (~10 μs) High voltage | Seiko Epson, Usui et all JP 253401/96 IJ04 |

ACTUATOR MECHANISM (APPLIED ONLY TO SELECTED INK DROPS)

| | Description | Advantages | Disadvantages | Examples |
|---|---|---|---|---|
| | | generated without difficulty Does not require electrical poling | drive transistors required Full pagewidth print heads impractical due to actuator size | |
| Ferro-electric | An electric field is used to induce a phase transition between the antiferroelectric (AFE) and ferroelectric (FE) phase. Perovskite materials such as tin modified lead lanthanum zirconate titanate (PLZSnT) exhibit large strains of up to 1% associated with the AFE to FE phase transition. | Low power consumption Many ink types can be used Fast operation (<1 μs) Relatively high longitudinal strain High efficiency Electric field strength of around 3 V/μm can be readily provided | Difficult to integrate with electronics Unusual materials such as PLZSnT are required Actuators require a large area | IJ04 |
| Electro-static plates | Conductive plates are separated by a compressible or fluid dielectric (usually air). Upon application of a voltage, the plates attract each other and displace ink, causing drop ejection. The conductive plates may be in a comb or honeycomb structure, or stacked to increase the surface area and therefore the force. | Low power consumption Many ink types can be used Fast operation | Difficult to operate electrostatic devices in an aqueous environment The electrostatic actuator will normally need to be separated from the ink Very large area required to achieve high forces High voltage drive transistors may be required Full pagewidth print heads are not competitive due to actuator size | IJ02, IJ04 |
| Electro-static pull on ink | A strong electric field is applied to the ink, whereupon electrostatic attraction accelerates the ink towards the print medium. | Low current consumption Low temperature | High voltage required May be damaged by sparks due to air breakdown Required field strength increases as the drop size decreases High voltage drive transistors required Electrostatic field attracts dust | 1989 Saito et al, U.S. Pat. No. 4,799,068 1989 Miura et al, U.S. Pat. No. 4,810,954 Tone-jet |
| Permanent magnet electro-magnetic | An electromagnet directly attracts a permanent magnet, displacing ink and causing drop ejection. Rare earth magnets with a field strength around 1 Tesla can be used. Examples are: Samarium | Low power consumption Many ink types can be used Fast operation High efficiency Easy extension from single nozzles to | Complex fabrication Permanent magnetic material such as Neodymium Iron Boron (NdFeB) required. High local currents required Copper | IJ07, IJ10 |

-continued

| ACTUATOR MECHANISM (APPLIED ONLY TO SELECTED INK DROPS) | | | | |
|---|---|---|---|---|
| | Description | Advantages | Disadvantages | Examples |
| | Cobalt (SaCo) and magnetic materials in the neodymium iron boron family (NdFeB, NdDyFeBNb, NdDyFeB, etc) | pagewidth print heads | metalization should be used for long electromigration lifetime and low resistivity Pigmented inks are usually infeasible Operating temperature limited to the Curie temperature (around 540 K) | |
| Soft magnetic core electro-magnetic | A solenoid induced a magnetic field in a soft magnetic core or yoke fabricated from a ferrous material such as electroplated iron alloys such as CoNiFe [1], CoFe, or NiFe alloys. Typically, the soft magnetic material is in two parts, which are normally held apart by a spring. When the solenoid is actuated, the two parts attract, displacing the ink. | Low power consumption Many ink types can be used Fast operation High efficiency Easy extension from single nozzles to pagewidth print heads | Complex fabrication Materials not usually present in a CMOS fab such as NiFe, CoNiFe, or CoFe are required High local currents required Copper metalization should be used for long electromigration lifetime and low resistivity Electroplating is required High saturation flux density is required (2.0-2.1 T is achievable with CoNiFe [1]) | IJ01, IJ05, IJ08, IJ10, IJ12, IJ14, IJ15, IJ17 |
| Lorenz force | The Lorenz force acting on a current carrying wire in a magnetic field is utilized. This allows the magnetic field to be supplied externally to the print head, for example with rare earth permanent magnets. Only the current carrying wire need be fabricated on the print-head, simplifying materials requirements. | Low power consumption Many ink types can be used Fast operation High efficiency Easy extension from single nozzles to pagewidth print heads | Force acts as a twisting motion Typically, only a quarter of the solenoid length provides force in a useful direction High local currents required Copper metalization should be used for long electromigration lifetime and low resistivity Pigmented inks are usually infeasible | IJ06, IJ11, IJ13, IJ16 |
| Magneto-striction | The actuator uses the giant magnetostrictive effect of materials such as Terfenol-D (an alloy of terbium, dysprosium and iron developed at the Naval Ordnance Laboratory, hence Ter-Fe-NOL). For | Many ink types can be used Fast operation Easy extension from single nozzles to pagewidth print heads High force is available | Force acts as a twisting motion Unusual materials such as Terfenol-D are required High local currents required Copper metalization should be used for long electromigration | Fischenbeck, U.S. Pat. No. 4,032,929 IJ25 |

ACTUATOR MECHANISM (APPLIED ONLY TO SELECTED INK DROPS)

|  | Description | Advantages | Disadvantages | Examples |
|---|---|---|---|---|
|  | best efficiency, the actuator should be pre-stressed to approx. 8 MPa. |  | lifetime and low resistivity Pre-stressing may be required |  |
| Surface tension reduction | Ink under positive pressure is held in a nozzle by surface tension. The surface tension of the ink is reduced below the bubble threshold, causing the ink to egress from the nozzle. | Low power consumption Simple construction No unusual materials required in fabrication High efficiency Easy extension from single nozzles to pagewidth print heads | Requires supplementary force to effect drop separation Requires special ink surfactants Speed may be limited by surfactant properties | Silverbrook, EP 0771 658 A2 and related patent applications |
| Viscosity reduction | The ink viscosity is locally reduced to select which drops are to be ejected. A viscosity reduction can be achieved electrothermally with most inks, but special inks can be engineered for a 100:1 viscosity reduction. | Simple construction No unusual materials required in fabrication Easy extension from single nozzles to pagewidth print heads | Requires supplementary force to effect drop separation Requires special ink viscosity properties High speed is difficult to achieve Requires oscillating ink pressure A high temperature difference (typically 80 degrees) is required | Silverbrook, EP 0771 658 A2 and related patent applications |
| Acoustic | An acoustic wave is generated and focussed upon the drop ejection region. | Can operate without a nozzle plate | Complex drive circuitry Complex fabrication Low efficiency Poor control of drop position Poor control of drop volume | 1993 Hadimioglu et al, EUP 550,192 1993 Elrod et al, EUP 572,220 |
| Thermo-elastic bend actuator | An actuator which relies upon differential thermal expansion upon Joule heating is used. | Low power consumption Many ink types can be used Simple planar fabrication Small chip area required for each actuator Fast operation High efficiency CMOS compatible voltages and currents Standard MEMS processes can be used Easy extension from single nozzles to pagewidth print heads | Efficient aqueous operation requires a thermal insulator on the hot side Corrosion prevention can be difficult Pigmented inks may be infeasible, as pigment particles may jam the bend actuator | IJ03, IJ09, IJ17, IJ18, IJ19, IJ20, IJ21, IJ22, IJ23, IJ24, IJ27, IJ28, IJ29, IJ30, IJ31, IJ32, IJ33, IJ34, IJ35, IJ36, IJ37, IJ38, IJ39, IJ40, IJ41 |

ACTUATOR MECHANISM (APPLIED ONLY TO SELECTED INK DROPS)

|  | Description | Advantages | Disadvantages | Examples |
| --- | --- | --- | --- | --- |
| High CTE thermo-elastic actuator | A material with a very high coefficient of thermal expansion (CTE) such as polytetrafluoroethylene (PTFE) is used. As high CTE materials are usually non-conductive, a heater fabricated from a conductive material is incorporated. A 50 μm long PTFE bend actuator with polysilicon heater and 15 mW power input can provide 180 μN force and 10 μm deflection. Actuator motions include: Bend Push Buckle Rotate | High force can be generated Three methods of PTFE deposition are under development: chemical vapor deposition (CVD), spin coating, and evaporation PTFE is a candidate for low dielectric constant insulation in ULSI Very low power consumption Many ink types can be used Simple planar fabrication Small chip area required for each actuator Fast operation High efficiency CMOS compatible voltages and currents Easy extension from single nozzles to pagewidth print heads | Requires special material (e.g. PTFE) Requires a PTFE deposition process, which is not yet standard in ULSI fabs PTFE deposition cannot be followed with high temperature (above 350° C.) processing Pigmented inks may be infeasible, as pigment particles may jam the bend actuator | IJ09, IJ17, IJ18, IJ20, IJ21, IJ22, IJ23, IJ24, IJ27, IJ28, IJ29, IJ30, IJ31, IJ42, IJ43, IJ44 |
| Conductive polymer thermo-elastic actuator | A polymer with a high coefficient of thermal expansion (such as PTFE) is doped with conducting substances to increase its conductivity to about 3 orders of magnitude below that of copper. The conducting polymer expands when resistively heated. Examples of conducting dopants include: Carbon nanotubes Metal fibers Conductive polymers such as doped polythiophene Carbon granules | High force can be generated Very low power consumption Many ink types can be used Simple planar fabrication Small chip area required for each actuator Fast operation High efficiency CMOS compatible voltages and currents Easy extension from single nozzles to pagewidth print heads | Requires special materials development (High CTE conductive polymer) Requires a PTFE deposition process, which is not yet standard in ULSI fabs PTFE deposition cannot be followed with high temperature (above 350° C.) processing Evaporation and CVD deposition techniques cannot be used Pigmented inks may be infeasible, as pigment particles may jam the bend actuator | IJ24 |

-continued

ACTUATOR MECHANISM (APPLIED ONLY TO SELECTED INK DROPS)

| | Description | Advantages | Disadvantages | Examples |
|---|---|---|---|---|
| Shape memory alloy | A shape memory alloy such as TiNi (also known as Nitinol - Nickel Titanium alloy developed at the Naval Ordnance Laboratory) is thermally switched between its weak martensitic state and its high stiffness austenic state. The shape of the actuator in its martensitic state is deformed relative to the austenic shape. The shape change causes ejection of a drop. | High force is available (stresses of hundreds of MPa) Large strain is available (more than 3%) High corrosion resistance Simple construction Easy extension from single nozzles to pagewidth print heads Low voltage operation | Fatigue limits maximum number of cycles Low strain (1%) is required to extend fatigue resistance Cycle rate limited by heat removal Requires unusual materials (TiNi) The latent heat of transformation must be provided High current operation Requires prestressing to distort the martensitic state | IJ26 |
| Linear Magnetic Actuator | Linear magnetic actuators include the Linear Induction Actuator (LIA), Linear Permanent Magnet Synchronous Actuator (LPMSA), Linear Reluctance Synchronous Actuator (LRSA), Linear Switched Reluctance Actuator (LSRA), and the Linear Stepper Actuator (LSA). | Linear Magnetic actuators can be constructed with high thrust, long travel, and high efficiency using planar semiconductor fabrication techniques Long actuator travel is available Medium force is available Low voltage operation | Requires unusual semiconductor materials such as soft magnetic alloys (e.g. CoNiFe) Some varieties also require permanent magnetic materials such as Neodymium iron boron (NdFeB) Requires complex multi-phase drive circuitry High current operation | IJ12 |

BASIC OPERATION MODE

| | Description | Advantages | Disadvantages | Examples |
|---|---|---|---|---|
| Actuator directly pushes ink | This is the simplest mode of operation: the actuator directly supplies sufficient kinetic energy to expel the drop. The drop must have a sufficient velocity to overcome the surface tension. | Simple operation No external fields required Satellite drops can be avoided if drop velocity is less than 4 m/s Can be efficient, depending upon the actuator used | Drop repetition rate is usually limited to around 10 kHz. However, this is not fundamental to the method, but is related to the refill method normally used All of the drop kinetic energy must be provided by the actuator Satellite drops usually form if drop velocity is greater than 4.5 m/s | Thermal ink jet Piezoelectric ink jet IJ01, IJ02, IJ03, IJ04, IJ05, IJ06, IJ07, IJ09, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |

-continued

| | | BASIC OPERATION MODE | | |
|---|---|---|---|---|
| | Description | Advantages | Disadvantages | Examples |
| Proximity | The drops to be printed are selected by some manner (e.g. thermally induced surface tension reduction of pressurized ink). Selected drops are separated from the ink in the nozzle by contact with the print medium or a transfer roller. | Very simple print head fabrication can be used The drop selection means does not need to provide the energy required to separate the drop from the nozzle | Requires close proximity between the print head and the print media or transfer roller May require two print heads printing alternate rows of the image Monolithic color print heads are difficult | Silverbrook, EP 0771 658 A2 and related patent applications |
| Electro-static pull on ink | The drops to be printed are selected by some manner (e.g. thermally induced surface tension reduction of pressurized ink). Selected drops are separated from the ink in the nozzle by a strong electric field. | Very simple print head fabrication can be used The drop selection means does not need to provide the energy required to separate the drop from the nozzle | Requires very high electrostatic field Electrostatic field for small nozzle sizes is above air breakdown Electrostatic field may attract dust | Silverbrook, EP 0771 658 A2 and related patent applications Tone-Jet |
| Magnetic pull on ink | The drops to be printed are selected by some manner (e.g. thermally induced surface tension reduction of pressurized ink). Selected drops are separated from the ink in the nozzle by a strong magnetic field acting on the magnetic ink. | Very simple print head fabrication can be used The drop selection means does not need to provide the energy required to separate the drop from the nozzle | Requires magnetic ink Ink colors other than black are difficult Requires very high magnetic fields | Silverbrook, EP 0771 658 A2 and related patent applications |
| Shutter | The actuator moves a shutter to block ink flow to the nozzle. The ink pressure is pulsed at a multiple of the drop ejection frequency. | High speed (>50 kHz) operation can be achieved due to reduced refill time Drop timing can be very accurate The actuator energy can be verylow | Moving parts are required Requires ink pressure modulator Friction and wear must be considered Stiction is possible | IJ13, IJ17, IJ21 |
| Shuttered grill | The actuator moves a shutter to block ink flow through a grill to the nozzle. The shutter movement need only be equal to the width of the grill holes. | Actuators with small travel can be used Actuators with small force can be used High speed (>50 kHz) operation can be achieved | Moving parts are required Requires ink pressure modulator Friction and wear must be considered Stiction is possible | IJ08, IJ15, IJ18, IJ19 |

-continued

BASIC OPERATION MODE

| | Description | Advantages | Disadvantages | Examples |
|---|---|---|---|---|
| Pulsed magnetic pull on ink pusher | A pulsed magnetic field attracts an 'ink pusher' at the drop ejection frequency. An actuator controls a catch, which prevents the ink pusher from moving when a drop is not to be ejected. | Extremely low energy operation is possible No heat dissipation problems | Requires an external pulsed magnetic field Requires special materials for both the actuator and the ink pusher Complex construction | IJ10 |

AUXILIARY MECHANISM (APPLIED TO ALL NOZZLES)

| | Description | Advantages | Disadvantages | Examples |
|---|---|---|---|---|
| None | The actuator directly fires the ink drop, and there is no external field or other mechanism required. | Simplicity of construction Simplicity of operation Small physical size | Drop ejection energy must be supplied by individual nozzle actuator | Most ink jets, including piezoelectric and thermal bubble. IJ01, IJ02, IJ03, IJ04, IJ05, IJ07, IJ09, IJ11, IJ12, IJ14, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Oscillating ink pressure (including acoustic stimulation) | The ink pressure oscillates, providing much of the drop ejection energy. The actuator selects which drops are to be fired by selectively blocking or enabling nozzles. The ink pressure oscillation may be achieved by vibrating the print head, or preferably by an actuator in the ink supply. | Oscillating ink pressure can provide a refill pulse, allowing higher operating speed The actuators may operate with much lower energy Acoustic lenses can be used to focus the sound on the nozzles | Requires external ink pressure oscillator Ink pressure phase and amplitude must be carefully controlled Acoustic reflections in the ink chamber must be designed for | Silverbrook, EP 0771 658 A2 and related patent applications IJ08, IJ13, IJ15, IJ17, IJ18, IJ19, IJ21 |
| Media proximity | The print head is placed in close proximity to the print medium. Selected drops protrude from the print head further than unselected drops, and contact the print medium. The drop soaks into the medium fast enough to cause drop separation. | Low power High accuracy Simple print head construction | Precision assembly required Paper fibers may cause problems Cannot print on rough substrates | Silverbrook, EP 0771 658 A2 and related patent applications |

-continued

AUXILIARY MECHANISM (APPLIED TO ALL NOZZLES)

| | Description | Advantages | Disadvantages | Examples |
|---|---|---|---|---|
| Transfer roller | Drops are printed to a transfer roller instead of straight to the print medium. A transfer roller can also be used for proximity drop separation. | High accuracy Wide range of print substrates can be used Ink can be dried on the transfer roller | Bulky Expensive Complex construction | Silverbrook, EP 0771 658 A2 and related patent applications Tektronix hot melt piezoelectric ink jet Any of the IJ series |
| Electrostatic | An electric field is used to accelerate selected drops towards the print medium. | Low power Simple print head construction | Field strength required for separation of small drops is near or above air breakdown | Silverbrook, EP 0771 658 A2 and related patent applications Tone-Jet |
| Direct magnetic field | A magnetic field is used to accelerate selected drops of magnetic ink towards the print medium. | Low power Simple print head construction | Requires magnetic ink Requires strong magnetic field | Silverbrook, EP 0771 658 A2 and related patent applications |
| Cross magnetic field | The print head is placed in a constant magnetic field. The Lorenz force in a current carrying wire is used to move the actuator. | Does not require magnetic materials to be integrated in the print head manufacturing process | Requires external magnet Current densities may be high, resulting in electromigration problems | IJ06, IJ16 |
| Pulsed magnetic field | A pulsed magnetic field is used to cyclically attract a paddle, which pushes on the ink. A small actuator moves a catch, which selectively prevents the paddle from moving. | Very low power operation is possible Small print head size | Complex print head construction Magnetic materials required in print head | IJ10 |

ACTUATOR AMPLIFICATION OR MODIFICATION METHOD

| | Description | Advantages | Disadvantages | Examples |
|---|---|---|---|---|
| None | No actuator mechanical amplification is used. The actuator directly drives the drop ejection process. | Operational simplicity | Many actuator mechanisms have insufficient travel, or insufficient force, to efficiently drive the drop ejection process | Thermal Bubble Ink jet IJ01, IJ02, IJ06, IJ07, IJ16, IJ25, IJ26 |
| Differential expansion bend actuator | An actuator material expands more on one side than on the other. The expansion may be thermal, piezoelectric, magnetostrictive, or other mechanism. The bend actuator converts a high force low travel actuator | Provides greater travel in a reduced print head area | High stresses are involved Care must be taken that the materials do not delaminate Residual bend resulting from high temperature or high stress during formation | Piezoelectric IJ03, IJ09, IJ17, IJ18, IJ19, IJ20, IJ21, IJ22, IJ23, IJ24, IJ27, IJ29, IJ30, IJ31, IJ32, IJ33, IJ34, IJ35, IJ36, IJ37, IJ38, IJ39, IJ42, IJ43, IJ44 |

-continued

| | ACTUATOR AMPLIFICATION OR MODIFICATION METHOD | | | |
|---|---|---|---|---|
| | Description | Advantages | Disadvantages | Examples |
| | mechanism to high travel, lower force mechanism. | | | |
| Transient bend actuator | A trilayer bend actuator where the two outside layers are identical. This cancels bend due to ambient temperature and residual stress. The actuator only responds to transient heating of one side or the other. | Very good temperature stability High speed, as a new drop can be fired before heat dissipates Cancels residual stress of formation | High stresses are involved Care must be taken that the materials do not delaminate | IJ40, IJ41 |
| Reverse spring | The actuator loads a spring. When the actuator is turned off, the spring releases. This can reverse the force/distance curve of the actuator to make it compatible with the force/time requirements of the drop ejection. | Better coupling to the ink | Fabrication complexity High stress in the spring | IJ05, IJ11 |
| Actuator stack | A series of thin actuators are stacked. This can be appropriate where actuators require high electric field strength, such as electrostatic and piezoelectric actuators. | Increased travel Reduced drive voltage | Increased fabrication complexity Increased possibility of short circuits due to pinholes | Some piezoelectric ink jets IJ04 |
| Multiple actuators | Multiple smaller actuators are used simultaneously to move the ink. Each actuator need provide only a portion of the force required. | Increases the force available from an actuator Multiple actuators can be positioned to control ink flow accurately | Actuator forces may not add linearly, reducing efficiency | IJ12, IJ13, IJ18, IJ20, IJ22, IJ28, IJ42, IJ43 |
| Linear Spring | A linear spring is used to transform a motion with small travel and high force into a longer travel, lower force motion. | Matches low travel actuator with higher travel requirements Non-contact method of motion transformation | Requires print head area for the spring | IJ15 |
| Coiled actuator | A bend actuator is coiled to provide greater travel in a reduced chip area. | Increases travel Reduces chip area Planar implementations are relatively easy to fabricate. | Generally restricted to planar implementations due to extreme fabrication difficulty in other orientations. | IJ17, IJ21, IJ34, IJ35 |
| Flexure bend actuator | A bend actuator has a small region near the fixture point, which flexes much more readily than the remainder of the actuator. The actuator flexing is effectively | Simple means of increasing travel of a bend actuator | Care must be taken not to exceed the elastic limit in the flexure area Stress distribution is very uneven Difficult to accurately model | IJ10, IJ19, IJ33 |

-continued

| | ACTUATOR AMPLIFICATION OR MODIFICATION METHOD | | | |
|---|---|---|---|---|
| | Description | Advantages | Disadvantages | Examples |
| | converted from an even coiling to an angular bend, resulting in greater travel of the actuator tip. | | with finite element analysis | |
| Catch | The actuator controls a small catch. The catch either enables or disables movement of an ink pusher that is controlled in a bulk manner. | Very low actuator energy Very small actuator size | Complex construction Requires external force Unsuitable for pigmented inks | IJ10 |
| Gears | Gears can be used to increase travel at the expense of duration. Circular gears, rack and pinion, ratchets, and other gearing methods can be used. | Low force, low travel actuators can be used Can be fabricated using standard surface MEMS processes | Moving parts are required Several actuator cycles are required More complex drive electronics Complex construction Friction, friction, and wear are possible | IJ13 |
| Buckle plate | A buckle plate can be used to change a slow actuator into a fast motion. It can also convert a high force, low travel actuator into a high travel, medium force motion. | Very fast movement achievable | Must stay within elastic limits of the materials for long device life High stresses involved Generally high power requirement | S. Hirata et al, "An Ink-jet Head Using Diaphragm Microactuator", Proc. IEEE MEMS, February 1996, pp 418-423. IJ18, IJ27 |
| Tapered magnetic pole | A tapered magnetic pole can increase travel at the expense of force. | Linearizes the magnetic force/distance curve | Complex construction | IJ14 |
| Lever | A lever and fulcrum is used to transform a motion with small travel and high force into a motion with longer travel and lower force. The lever can also reverse the direction of travel. | Matches low travel actuator with higher travel requirements Fulcrum area has no linear movement, and can be used for a fluid seal | High stress around the fulcrum | IJ32, IJ36, IJ37 |
| Rotary impeller | The actuator is connected to a rotary impeller. A small angular deflection of the actuator results in a rotation of the impeller vanes, which push the ink against stationary vanes and out of the nozzle. | High mechanical advantage The ratio of force to travel of the actuator can be matched to the nozzle requirements by varying the number of impeller vanes | Complex construction Unsuitable for pigmented inks | IJ28 |
| Acoustic lens | A refractive or diffractive (e.g. zone plate) acoustic lens is used to concentrate sound waves. | No moving parts | Large area required Only relevant for acoustic ink jets | 1993 Hadimioglu et al, EUP 550,192 1993 Elrod et al, EUP 572,220 |

ACTUATOR AMPLIFICATION OR MODIFICATION METHOD

| | Description | Advantages | Disadvantages | Examples |
|---|---|---|---|---|
| Sharp conductive point | A sharp point is used to concentrate an electrostatic field. | Simple construction | Difficult to fabricate using standard VLSI processes for a surface ejecting ink-jet<br>Only relevant for electrostatic ink jets | Tone-jet |

ACTUATOR MOTION

| | Description | Advantages | Disadvantages | Examples |
|---|---|---|---|---|
| Volume expansion | The volume of the actuator changes, pushing the ink in all directions. | Simple construction in the case of thermal ink jet | High energy is typically required to achieve volume expansion. This leads to thermal stress, cavitation, and kogation in thermal ink jet implementations | Hewlett-Packard Thermal Ink jet<br>Canon Bubblejet |
| Linear, normal to chip surface | The actuator moves in a direction normal to the print head surface. The nozzle is typically in the line of movement. | Efficient coupling to ink drops ejected normal to the surface | High fabrication complexity may be required to achieve perpendicular motion | IJ01, IJ02, IJ04, IJ07, IJ11, IJ14 |
| Parallel to chip surface | The actuator moves parallel to the print head surface. Drop ejection may still be normal to the surface. | Suitable for planar fabrication | Fabrication complexity<br>Friction<br>Stiction | IJ12, IJ13, IJ15, IJ33,, IJ34, IJ35, IJ36 |
| Membrane push | An actuator with a high force but small area is used to push a stiff membrane that is in contact with the ink. | The effective area of the actuator becomes the membrane area | Fabrication complexity<br>Actuator size<br>Difficulty of integration in a VLSI process | 1982 Howkins U.S. Pat. No. 4,459,601 |
| Rotary | The actuator causes the rotation of some element, such as a grill or impeller | Rotary levers may be used to increase travel<br>Small chip area requirements | Device complexity<br>May have friction at a pivot point | IJ05, IJ08, IJ13, IJ28 |
| Bend | The actuator bends when energized. This may be due to differential thermal expansion, piezoelectric expansion, magnetostriction, or other form of relative dimensional change. | A very small change in dimensions can be converted to a large motion. | Requires the actuator to be made from at least two distinct layers, or to have a thermal difference across the actuator | 1970 Kyser et al U.S. Pat. No. 3,946,398<br>1973 Stemme U.S. Pat. No. 3,747,120<br>IJ03, IJ09, IJ10, IJ19, IJ23, IJ24, IJ25, IJ29, IJ30, IJ31, IJ33, IJ34, IJ35 |

-continued

| | ACTUATOR MOTION | | | |
|---|---|---|---|---|
| | Description | Advantages | Disadvantages | Examples |
| Swivel | The actuator swivels around a central pivot. This motion is suitable where there are opposite forces applied to opposite sides of the paddle, e.g. Lorenz force. | Allows operation where the net linear force on the paddle is zero Small chip area requirements | Inefficient coupling to the ink motion | IJ06 |
| Straighten | The actuator is normally bent, and straightens when energized. | Can be used with shape memory alloys where the austenic phase is planar | Requires careful balance of stresses to ensure that the quiescent bend is accurate | IJ26, IJ32 |
| Double bend | The actuator bends in one direction when one element is energized, and bends the other way when another element is energized. | One actuator can be used to power two nozzles. Reduced chip size. Not sensitive to ambient temperature | Difficult to make the drops ejected by both bend directions identical. A small efficiency loss compared to equivalent single bend actuators. | IJ36, IJ37, IJ38 |
| Shear | Energizing the actuator causes a shear motion in the actuator material. | Can increase the effective travel of piezoelectric actuators | Not readily applicable to other actuator mechanisms | 1985 Fishbeck U.S. Pat. No. 4,584,590 |
| Radial constriction | The actuator squeezes an ink reservoir, forcing ink from a constricted nozzle. | Relatively easy to fabricate single nozzles from glass tubing as macroscopic structures | High force required Inefficient Difficult to integrate with VLSI processes | 1970 Zoltan U.S. Pat. No. 3,683,212 |
| Coil/ uncoil | A coiled actuator uncoils or coils more tightly. The motion of the free end of the actuator ejects the ink. | Easy to fabricate as a planar VLSI process Small area required, therefore low cost | Difficult to fabricate for non-planar devices Poor out-of-plane stiffness | IJ17, IJ21, IJ34, IJ35 |
| Bow | The actuator bows (or buckles) in the middle when energized. | Can increase the speed of travel Mechanically rigid | Maximum travel is constrained High force required | IJ16, IJ18, IJ27 |
| Push-Pull | Two actuators control a shutter. One actuator pulls the shutter, and the other pushes it. | The structure is pinned at both ends, so has a high out-of-plane rigidity | Not readily suitable for ink jets which directly push the ink | IJ18 |
| Curl inwards | A set of actuators curl inwards to reduce the volume of ink that they enclose. | Good fluid flow to the region behind the actuator increases efficiency | Design complexity | IJ20, IJ42 |
| Curl outwards | A set of actuators curl outwards, pressurizing ink in a chamber surrounding the actuators, and expelling ink from a nozzle in the chamber. | Relatively simple construction | Relatively large chip area | IJ43 |

-continued

| | | ACTUATOR MOTION | | |
|---|---|---|---|---|
| | Description | Advantages | Disadvantages | Examples |
| Iris | Multiple vanes enclose a volume of ink. These simultaneously rotate, reducing the volume between the vanes. | High efficiency Small chip area | High fabrication complexity Not suitable for pigmented inks | IJ22 |
| Acoustic vibration | The actuator vibrates at a high frequency. | The actuator can be physically distant from the ink | Large area required for efficient operation at useful frequencies Acoustic coupling and crosstalk Complex drive circuitry Poor control of drop volume and position | 1993 Hadimioglu et al, EUP 550,192 1993 Elrod et al, EUP 572,220 |
| None | In various ink jet designs the actuator does not move. | No moving parts | Various other tradeoffs are required to eliminate moving parts | Silverbrook, EP 0771 658 A2 and related patent applications Tone-jet |

| | | NOZZLE REFILL METHOD | | |
|---|---|---|---|---|
| | Description | Advantages | Disadvantages | Examples |
| Surface tension | This is the normal way that ink jets are refilled. After the actuator is energized, it typically returns rapidly to its normal position. This rapid return sucks in air through the nozzle opening. The ink surface tension at the nozzle then exerts a small force restoring the meniscus to a minimum area. This force refills the nozzle. | Fabrication simplicity Operational simplicity | Low speed Surface tension force relatively small compared to actuator force Long refill time usually dominates the total repetition rate | Thermal ink jet Piezoelectric ink jet IJ01-IJ07, IJ10-IJ14, IJ16, IJ20, IJ22-IJ45 |
| Shuttered oscillating ink pressure | Ink to the nozzle chamber is provided at a pressure that oscillates at twice the drop ejection frequency. When a drop is to be ejected, the shutter is opened for 3 half cycles: drop ejection, actuator return, and refill. | High speed Low actuator energy, as the actuator need only open or close the shutter, instead of ejecting the ink drop | Requires common ink pressure oscillator May not be suitable for pigmented inks | IJ08, IJ13, IJ15, IJ17, IJ18, IJ19, IJ21 |

NOZZLE REFILL METHOD

|  | Description | Advantages | Disadvantages | Examples |
| --- | --- | --- | --- | --- |
|  | The shutter is then closed to prevent the nozzle chamber emptying during the next negative pressure cycle. |  |  |  |
| Refill actuator | After the main actuator has ejected a drop a second (refill) actuator is energized. The refill actuator pushes ink into the nozzle chamber. The refill actuator returns slowly, to prevent its return from emptying the chamber again. | High speed, as the nozzle is actively refilled | Requires two independent actuators per nozzle | IJ09 |
| Positive ink pressure | The ink is held a slight positive pressure. After the ink drop is ejected, the nozzle chamber fills quickly as surface tension and ink pressure both operate to refill the nozzle. | High refill rate, therefore a high drop repetition rate is possible | Surface spill must be prevented Highly hydrophobic print head surfaces are required | Silverbrook, EP 0771 658 A2 and related patent applications Alternative for:, IJ01-IJ07, IJ10-IJ14, IJ16, IJ20, IJ22-IJ45 |

METHOD OF RESTRICTING BACK-FLOW THROUGH INLET

|  | Description | Advantages | Disadvantages | Examples |
| --- | --- | --- | --- | --- |
| Long inlet channel | The ink inlet channel to the nozzle chamber is made long and relatively narrow, relying on viscous drag to reduce inlet back-flow. | Design simplicity Operational simplicity Reduces crosstalk | Restricts refill rate May result in a relatively large chip area Only partially effective | Thermal ink jet Piezoelectric ink jet IJ42, IJ43 |
| Positive ink pressure | The ink is under a positive pressure, so that in the quiescent state some of the ink drop already protrudes from the nozzle. This reduces the pressure in the nozzle chamber which is required to eject a certain volume of ink. The reduction in chamber pressure results in a reduction in ink pushed out through the inlet. | Drop selection and separation forces can be reduced Fast refill time | Requires a method (such as a nozzle rim or effective hydrophobizing, or both) to prevent flooding of the ejection surface of the print head. | Silverbrook, EP 0771 658 A2 and related patent applications Possible operation of the following: IJ01-IJ07, IJ09-IJ12, IJ14, IJ16, IJ20, IJ22,, IJ23-IJ34, IJ36-IJ41, IJ44 |

METHOD OF RESTRICTING BACK-FLOW THROUGH INLET

| | Description | Advantages | Disadvantages | Examples |
|---|---|---|---|---|
| Baffle | One or more baffles are placed in the inlet ink flow. When the actuator is energized, the rapid ink movement creates eddies which restrict the flow through the inlet. The slower refill process is unrestricted, and does not result in eddies. | The refill rate is not as restricted as the long inlet method. Reduces crosstalk | Design complexity May increase fabrication complexity (e.g. Tektronix hot melt Piezoelectric print heads). | HP Thermal Ink Jet Tektronix piezoelectric ink jet |
| Flexible flap restricts inlet | In this method recently disclosed by Canon, the expanding actuator (bubble) pushes on a flexible flap that restricts the inlet. | Significantly reduces back-flow for edge-shooter thermal ink jet devices | Not applicable to most ink jet configurations Increased fabrication complexity Inelastic deformation of polymer flap results in creep over extended use | Canon |
| Inlet filter | A filter is located between the ink inlet and the nozzle chamber. The filter has a multitude of small holes or slots, restricting ink flow. The filter also removes particles which may block the nozzle. | Additional advantage of ink filtration Ink filter may be fabricated with no additional process steps | Restricts refill rate May result in complex construction | IJ04, IJ12, IJ24, IJ27, IJ29, IJ30 |
| Small inlet compared to nozzle | The ink inlet channel to the nozzle chamber has a substantially smaller cross section than that of the nozzle, resulting in easier ink egress out of the nozzle than out of the inlet. | Design simplicity | Restricts refill rate May result in a relatively large chip area Only partially effective | IJ02, IJ37, IJ44 |
| Inlet shutter | A secondary actuator controls the position of a shutter, closing off the ink inlet when the main actuator is energized. | Increases speed of the ink-jet print head operation | Requires separate refill actuator and drive circuit | IJ09 |
| The inlet is located behind the ink-pushing surface | The method avoids the problem of inlet back-flow by arranging the ink-pushing surface of the actuator between the inlet and the nozzle. | Back-flow problem is eliminated | Requires careful design to minimize the negative pressure behind the paddle | IJ01, IJ03, IJ05, IJ06, IJ07, IJ10, IJ11, IJ14, IJ16, IJ22, IJ23, IJ25, IJ28, IJ31, IJ32, IJ33, IJ34, IJ35, IJ36, IJ39, IJ40, IJ41 |
| Part of the actuator moves to shut off the inlet | The actuator and a wall of the ink chamber are arranged so that the motion of the actuator closes off the inlet. | Significant reductions in back-flow can be achieved Compact designs possible | Small increase in fabrication complexity | IJ07, IJ20, IJ26, IJ38 |

METHOD OF RESTRICTING BACK-FLOW THROUGH INLET

| | Description | Advantages | Disadvantages | Examples |
|---|---|---|---|---|
| Nozzle actuator does not result in ink back-flow | In some configurations of ink jet, there is no expansion or movement of an actuator which may cause ink back-flow through the inlet. | Ink back-flow problem is eliminated | None related to ink back-flow on actuation | Silverbrook, EP 0771 658 A2 and related patent applications Valve-jet Tone-jet |

NOZZLE CLEARING METHOD

| | Description | Advantages | Disadvantages | Examples |
|---|---|---|---|---|
| Normal nozzle firing | All of the nozzles are fired periodically, before the ink has a chance to dry. When not in use the nozzles are sealed (capped) against air. The nozzle firing is usually performed during a special clearing cycle, after first moving the print head to a cleaning station. | No added complexity on the print head | May not be sufficient to displace dried ink | Most ink jet systems IJ01, IJ02, IJ03, IJ04, IJ05, IJ06, IJ07, IJ09, IJ10, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ36, IJ37, IJ38, IJ39, IJ40,, IJ41, IJ42, IJ43, IJ44,, IJ45 |
| Extra power to ink heater | In systems which heat the ink, but do not boil it under normal situations, nozzle clearing can be achieved by over-powering the heater and boiling ink at the nozzle. | Can be highly effective if the heater is adjacent to the nozzle | Requires higher drive voltage for clearing May require larger drive transistors | Silverbrook, EP 0771 658 A2 and related patent applications |
| Rapid succession of actuator pulses | The actuator is fired in rapid succession. In some configurations, this may cause heat build-up at the nozzle which boils the ink, clearing the nozzle. In other situations, it may cause sufficient vibrations to dislodge clogged nozzles. | Does not require extra drive circuits on the print head Can be readily controlled and initiated by digital logic | Effectiveness depends substantially upon the configuration of the ink jet nozzle | May be used with: IJ01, IJ02, IJ03, IJ04, IJ05, IJ06, IJ07, IJ09, IJ10, IJ11, IJ14, IJ16, IJ20, IJ22, IJ23, IJ24, IJ25, IJ27, IJ28, IJ29, IJ30, IJ31, IJ32, IJ33, IJ34, IJ36, IJ37, IJ38, IJ39, IJ40, IJ41, IJ42, IJ43, IJ44, IJ45 |
| Extra power to ink pushing actuator | Where an actuator is not normally driven to the limit of its motion, nozzle clearing may be assisted by providing an enhanced drive signal to the actuator. | A simple solution where applicable | Not suitable where there is a hard limit to actuator movement | May be used with: IJ03, IJ09, IJ16, IJ20, IJ23, IJ24, IJ25, IJ27, IJ29, IJ30, IJ31, IJ32, IJ39, IJ40, IJ41, IJ42, IJ43, IJ44, IJ45 |

-continued

| | NOZZLE CLEARING METHOD | | | |
|---|---|---|---|---|
| | Description | Advantages | Disadvantages | Examples |
| Acoustic resonance | An ultrasonic wave is applied to the ink chamber. This wave is of an appropriate amplitude and frequency to cause sufficient force at the nozzle to clear blockages. This is easiest to achieve if the ultrasonic wave is at a resonant frequency of the ink cavity. | A high nozzle clearing capability can be achieved May be implemented at very low cost in systems which already include acoustic actuators | High implementation cost if system does not already include an acoustic actuator | IJ08, IJ13, IJ15, IJ17, IJ18, IJ19, IJ21 |
| Nozzle clearing plate | A microfabricated plate is pushed against the nozzles. The plate has a post for every nozzle. A post moves through each nozzle, displacing dried ink. | Can clear severely clogged nozzles | Accurate mechanical alignment is required Moving parts are required There is risk of damage to the nozzles Accurate fabrication is required | Silverbrook, EP 0771 658 A2 and related patent applications |
| Ink pressure pulse | The pressure of the ink is temporarily increased so that ink streams from all of the nozzles. This may be used in conjunction with actuator energizing. | May be effective where other methods cannot be used | Requires pressure pump or other pressure actuator Expensive Wasteful of ink | May be used with all IJ series ink jets |
| Print head wiper | A flexible 'blade' is wiped across the print head surface. The blade is usually fabricated from a flexible polymer, e.g. rubber or synthetic elastomer. | Effective for planar print head surfaces Low cost | Difficult to use if print head surface is non-planar or very fragile Requires mechanical parts Blade can wear out in high volume print systems | Many ink jet systems |
| Separate ink boiling heater | A separate heater is provided at the nozzle although the normal drop e-ection mechanism does not require it. The heaters do not require individual drive circuits, as many nozzles can be cleared simultaneously, and no imaging is required. | Can be effective where other nozzle clearing methods cannot be used Can be implemented at no additional cost in some ink jet configurations | Fabrication complexity | Can be used with many IJ series ink jets |

| NOZZLE PLATE CONSTRUCTION | | | | |
|---|---|---|---|---|
| | Description | Advantages | Disadvantages | Examples |
| Electro-formed nickel | A nozzle plate is separately fabricated from electroformed nickel, and bonded to the print head chip. | Fabrication simplicity | High temperatures and pressures are required to bond nozzle plate Minimum thickness constraints Differential thermal expansion | Hewlett Packard Thermal Ink jet |
| Laser ablated or drilled polymer | Individual nozzle holes are ablated by an intense UV laser in a nozzle plate, which is typically a polymer such as polyimide or polysulphone | No masks required Can be quite fast Some control over nozzle profile is possible Equipment required is relatively low cost | Each hole must be individually formed Special equipment required Slow where there are many thousands of nozzles per print head May produce thin burrs at exit holes | Canon Bubblejet 1988 Sercel et al., SPIE, Vol. 998 Excimer Beam Applications, pp. 76-83 1993 Watanabe et al., U.S. Pat. No. 5,208,604 |
| Silicon micro-machined | A separate nozzle plate is micromachined from single crystal silicon, and bonded to the print head wafer. | High accuracy is attainable | Two part construction High cost Requires precision alignment Nozzles may be clogged by adhesive | K. Bean, IEEE Transactions on Electron Devices, Vol. ED-25, No. 10, 1978, pp 1185-1195 Xerox 1990 Hawkins et al., U.S. Pat. No. 4,899,181 |
| Glass capillaries | Fine glass capillaries are drawn from glass tubing. This method has been used for making individual nozzles, but is difficult to use for bulk manufacturing of print heads with thousands of nozzles. | No expensive equipment required Simple to make single nozzles | Very small nozzle sizes are difficult to form Not suited for mass production | 1970 Zoltan U.S. Pat. No. 3,683,212 |
| Monolithic, surface micro-machined using VLSI litho-graphic processes | The nozzle plate is deposited as a layer using standard VLSI deposition techniques. Nozzles are etched in the nozzle plate using VLSI lithography and etching. | High accuracy (<1 μm) Monolithic Low cost Existing processes can be used | Requires sacrificial layer under the nozzle plate to form the nozzle chamber Surface may be fragile to the touch | Silverbrook, EP 0771 658 A2 and related patent applications IJ01, IJ02, IJ04, IJ11, IJ12, IJ17, IJ18, IJ20, IJ22, IJ24, IJ27, IJ28, IJ29, IJ30, IJ31, IJ32, IJ33, IJ34, IJ36, IJ37, IJ38, IJ39, IJ40, IJ41, IJ42, IJ43, IJ44 |
| Monolithic, etched through substrate | The nozzle plate is a buried etch stop in the wafer. Nozzle chambers are etched in the front of the wafer, and the wafer is thinned from the back side. Nozzles are then etched in the etch stop layer. | High accuracy (<1 μm) Monolithic Low cost No differential expansion | Requires long etch times Requires a support wafer | IJ03, IJ05, IJ06, IJ07, IJ08, IJ09, IJ10, IJ13, IJ14, IJ15, IJ16, IJ19, IJ21, IJ23, IJ25, IJ26 |

-continued

| | | NOZZLE PLATE CONSTRUCTION | | |
|---|---|---|---|---|
| | Description | Advantages | Disadvantages | Examples |
| No nozzle plate | Various methods have been tried to eliminate the nozzles entirely, to prevent nozzle clogging. These include thermal bubble mechanisms and acoustic lens mechanisms | No nozzles to become clogged | Difficult to control drop position accurately Crosstalk problems | Ricoh 1995 Sekiya et al U.S. Pat. No. 5,412,413 1993 Hadimioglu et al EUP 550,192 1993 Elrod et al EUP 572,220 |
| Trough | Each drop ejector has a trough through which a paddle moves. There is no nozzle plate. | Reduced manufacturing complexity Monolithic | Drop firing direction is sensitive to wicking. | IJ35 |
| Nozzle slit instead of individual nozzles | The elimination of nozzle holes and replacement by a slit encompassing many actuator positions reduces nozzle clogging, but increases crosstalk due to ink surface waves | No nozzles to become clogged | Difficult to control drop position accurately Crosstalk problems | 1989 Saito et al U.S. Pat. No. 4,799,068 |

| | | DROP EJECTION DIRECTION | | |
|---|---|---|---|---|
| | Description | Advantages | Disadvantages | Examples |
| Edge ('edge shooter') | Ink flow is along the surface of the chip, and ink drops are ejected from the chip edge. | Simple construction No silicon etching required Good heat sinking via substrate Mechanically strong Ease of chip handing | Nozzles limited to edge High resolution is difficult Fast color printing requires one print head per color | Canon Bubblejet 1979 Endo et al GB patent 2,007,162 Xerox heater-in-pit 1990 Hawkins et al U.S. Pat. No. 4,899,181 Tone-jet |
| Surface ('roof shooter') | Ink flow is along the surface of the chip, and ink drops are ejected from the chip surface, normal to the plane of the chip. | No bulk silicon etching required Silicon can make an effective heat sink Mechanical strength | Maximum ink flow is severely restricted | Hewlett-Packard TIJ 1982 Vaught et al U.S. Pat. No. 4,490,728 IJ02, IJ11, IJ12, IJ20, IJ22 |
| Through chip, forward ('up shooter') | Ink flow is through the chip, and ink drops are ejected from the front surface of the chip. | High ink flow Suitable for pagewidth print heads High nozzle packing density therefore low manufacturing cost | Requires bulk silicon etching | Silverbrook, EP 0771 658 A2 and related patent applications IJ04, IJ17, IJ18, IJ24, IJ27-IJ45 |
| Through chip, reverse ('down shooter') | Ink flow is through the chip, and ink drops are ejected from the rear surface of the chip. | High ink flow Suitable for pagewidth print heads High nozzle packing density therefore low manufacturing cost | Requires wafer thinning Requires special handling during manufacture | IJ01, IJ03, IJ05, IJ06, IJ07, IJ08, IJ09, IJ10, IJ13, IJ14, IJ15, IJ16, IJ19, IJ21, IJ23, IJ25, IJ26 |

| DROP EJECTION DIRECTION | | | | |
|---|---|---|---|---|
| | Description | Advantages | Disadvantages | Examples |
| Through actuator | Ink flow is through the actuator, which is not fabricated as part of the same substrate as the drive transistors. | Suitable for piezoelectric print heads | Pagewidth print heads require several thousand connections to drive circuits Cannot be manufactured in standard CMOS fabs Complex assembly required | Epson Stylus Tektronix hot melt piezoelectric ink jets |

| INK TYPE | | | | |
|---|---|---|---|---|
| | Description | Advantages | Disadvantages | Examples |
| Aqueous, dye | Water based ink which typically contains: water, dye, surfactant, humectant, and biocide. Modern ink dyes have high water-fastness, light fastness | Environmentally friendly No odor | Slow drying Corrosive Bleeds on paper May strikethrough Cockles paper | Most existing ink jets All IJ series ink jets Silverbrook, EP 0771 658 A2 and related patent applications |
| Aqueous, pigment | Water based ink which typically contains: water, pigment, surfactant, humectant, and biocide. Pigments have an advantage in reduced bleed, wicking and strikethrough. | Environmentally friendly No odor Reduced bleed Reduced wicking Reduced strikethrough | Slow drying Corrosive Pigment may clog nozzles Pigment may clog actuator mechanisms Cockles paper | IJ02, IJ04, IJ21, IJ26, IJ27, IJ30 Silverbrook, EP 0771 658 A2 and related patent applications Piezoelectric ink-jets Thermal ink jets (with significant restrictions) |
| Methyl Ethyl Ketone (MEK) | MEK is a highly volatile solvent used for industrial printing on difficult surfaces such as aluminum cans. | Very fast drying Prints on various substrates such as metals and plastics | Odorous Flammable | All IJ series ink jets |
| Alcohol (ethanol, 2-butanol, and others) | Alcohol based inks can be used where the printer must operate at temperatures below the freezing point of water. An example of this is in-camera consumer photographic printing. | Fast drying Operates at sub-freezing temperatures Reduced paper cockle Low cost | Slight odor Flammable | All IJ series ink jets |

-continued

| | Description | Advantages | Disadvantages | Examples |
|---|---|---|---|---|
| | | INK TYPE | | |
| Phase change (hot melt) | The ink is solid at room temperature, and is melted in the print head before jetting. Hot melt inks are usually wax based, with a melting point around 80° C. After jetting the ink freezes almost instantly upon contacting the print medium or a transfer roller. | No drying time-ink instantly freezes on the print medium Almost any print medium can be used No paper cockle occurs No wicking occurs No bleed occurs No strikethrough occurs | High viscosity Printed ink typically has a 'waxy' feel Printed pages may 'block' Ink temperature may be above the curie point of permanent magnets Ink heaters consume power Long warm-up time | Tektronix hot melt piezoelectric ink jets 1989 Nowak U.S. Pat. No. 4,820,346 All IJ series ink jets |
| Oil | Oil based inks are extensively used in offset printing, They have advantages in improved characteristics on paper (especially no wicking or cockle). Oil soluble dies and pigments are required. | High solubility medium for some dyes Does not cockle paper Does not wick through paper | High viscosity: this is a significant limitation for use in ink jets, which usually require a low viscosity. Some short chain and multi-branched oils have a sufficiently low viscosity. Slow drying | All IJ series ink jets |
| Micro-emulsion | A microemulsion is a stable, self forming emulsion of oil, water, and surfactant. The characteristic drop size is less than 100 nm, and is determined by the preferred curvature of the surfactant. | Stops ink bleed High dye solubility Water, oil, and amphiphilic soluble dies can be used Can stabilize pigment suspensions | Viscosity higher than water Cost is slightly higher than water based ink High surfactant concentration required (around 5%) | All IJ series ink jets |

The invention claimed is:

1. An inkjet printhead comprising:
a pair of electrodes;
a heater having contacts abutting the pair of electrodes, a heater element for generating a vapour bubble in a quantity of ink and sloped side portions extending between the heater element and the contacts; and,
a nozzle spaced from the heater such that ink is ejected through the nozzle in response to the generation of a vapour bubble; wherein,
the heater element has higher electrical resistance than the contacts and the sloped side portions.

2. The inkjet printhead according to claim 1 wherein the heater comprises TiAlN.

3. The inkjet printhead according to claim 1 wherein the heater element is ring shaped.

4. The inkjet printhead according to claim 1 configured to print on a page and to be a pagewidth printhead.

5. The inkjet printhead according to claim 1 wherein the heater element is coated with a passivating material.

6. The inkjet printhead according to claim 1 wherein the heater element is configured such that an actuation energy of less than 500 nanojoules (nJ) is required to be applied to that heater element to heat that heater element sufficiently to form said vapour bubble to cause the ejection of said drop.

7. The inkjet printhead according to claim 1 configured to receive a supply of the ink at an ambient temperature, wherein each heater element is configured such that the energy required to be applied thereto to heat said part to cause the ejection of said drop is less than the energy required to heat a volume of said ink equal to the volume of the said drop, from a temperature equal to said ambient temperature to said boiling point.

8. The inkjet printhead according to claim 1 comprising a substrate having a substrate surface, wherein the areal density of the nozzles relative to the substrate surface exceeds 10,000 nozzles per square cm of substrate surface.

9. The inkjet printhead according to claim 1 wherein the heater element has two opposite sides and is configured such that said vapour bubble formed by that heater element is formed at both of said sides of that heater element.

10. The inkjet printhead according to claim 1 wherein the vapour bubble is collapsible and has a point of collapse, and the heater element is configured such that the point of collapse is spaced from the heater element.

11. The inkjet printhead according to claim 1 comprising a structure that is formed by chemical vapor deposition (CVD), the nozzles being incorporated on the structure.

12. The inkjet printhead according to claim 11 wherein the structure is less than 10 microns thick, the nozzles being incorporated on the structure.

13. A printhead integrated circuit according to claim 1 wherein the heater element is formed of solid material more than 90% of which, by atomic proportion, is constituted by at least one periodic element having an atomic number below 50.

14. The inkjet printhead according to claim 1 wherein the heater element includes solid material and is configured for a mass of less than 10 nanograms of the solid material of that heater element to be heated to a temperature above said boiling point thereby to heat said part of the ink to a temperature above said boiling point to cause the ejection of said drop.

15. The inkjet printhead according to claim 1 wherein the heater element is substantially covered by a conformal protective coating, the coating of each heater element having been applied substantially to all sides of the heater element simultaneously such that the coating is seamless.

* * * * *